US012782938B2

(12) United States Patent
Miyake et al.

(10) Patent No.: US 12,782,938 B2
(45) Date of Patent: Nov. 3, 2026

(54) ROUTE GENERATION METHOD, ROUTE GENERATION SYSTEM, AND ROUTE GENERATION PROGRAM

(71) Applicant: Yanmar Holdings Co., Ltd., Osaka (JP)

(72) Inventors: Koji Miyake, Okayama (JP); Takashi Mochida, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 198 days.

(21) Appl. No.: 18/244,299

(22) Filed: Sep. 11, 2023

(65) Prior Publication Data

US 2024/0085910 A1 Mar. 14, 2024

(30) Foreign Application Priority Data

Sep. 12, 2022 (JP) ................................ 2022-144447

(51) Int. Cl.
*G05D 1/00* (2024.01)

(52) U.S. Cl.
CPC ......... *G05D 1/0212* (2013.01); *G05D 1/0088* (2013.01)

(58) Field of Classification Search
CPC ............... G05D 1/0212; G05D 1/0088; G05D 1/2297; G05D 1/648; G05D 2105/15; G05D 2107/21; G05D 2109/10; A01B 69/008; A01B 69/007; A01B 69/00; G01C 21/20; A01C 11/003; B60W 60/001; B60W 2300/15
USPC ........................................................... 701/50
See application file for complete search history.

(56) References Cited

U.S. PATENT DOCUMENTS

| | | | | |
|---|---|---|---|---|
| 5,289,167 | A * | 2/1994 | Kurosawa | G01C 21/20 702/158 |
| 9,746,854 | B2 * | 8/2017 | Berkemeier | A01B 69/008 |
| 10,813,267 | B2 | 10/2020 | Shinkai et al. | |
| 11,805,720 | B2 * | 11/2023 | Kodama | A01B 69/008 |
| 12,038,752 | B1 * | 7/2024 | Blanton | A01D 34/008 |
| 2002/0116119 | A1 * | 8/2002 | Morita | G01C 21/20 701/467 |
| 2007/0193798 | A1 * | 8/2007 | Allard | B60T 7/22 180/169 |
| 2008/0201069 | A1 * | 8/2008 | Suzuki | G01C 21/20 701/465 |
| 2012/0095619 | A1 * | 4/2012 | Pack | G05D 1/0016 701/2 |

(Continued)

FOREIGN PATENT DOCUMENTS

| | | | |
|---|---|---|---|
| CN | 000114303500 | A | 4/2022 |
| WO | 2019049664 | A1 | 3/2019 |

*Primary Examiner* — Tuan C To
*Assistant Examiner* — Dominick Mulder
(74) *Attorney, Agent, or Firm* — Chris Mizumoto

(57) ABSTRACT

An acquisition processing unit acquires position information of a predetermined position of a work vehicle in a field. A registration processing unit registers the predetermined position as a reference point when the work vehicle has traveled a predetermined distance from the predetermined position, or when a predetermined time has elapsed since the work vehicle started to travel from the predetermined position. A generation processing unit generates a target route based on the reference point.

12 Claims, 12 Drawing Sheets

(56) References Cited

U.S. PATENT DOCUMENTS

| | | | | |
|---|---|---|---|---|
| 2015/0142258 | A1* | 5/2015 | Sugihara | G06Q 10/06 701/408 |
| 2016/0100522 | A1* | 4/2016 | Yamauchi | G05D 1/0219 701/25 |
| 2018/0210456 | A1* | 7/2018 | Uoya | A01B 69/008 |
| 2018/0310461 | A1* | 11/2018 | Shinkai | A01B 69/001 |
| 2019/0239502 | A1* | 8/2019 | Palomares | A01B 39/18 |
| 2020/0375084 | A1* | 12/2020 | Sakaguchi | A01B 69/008 |
| 2021/0397189 | A1* | 12/2021 | Takase | G05D 1/0094 |
| 2021/0397190 | A1* | 12/2021 | Takase | G05D 1/0088 |
| 2022/0089161 | A1* | 3/2022 | Takebayashi | B60W 30/18145 |
| 2022/0185316 | A1* | 6/2022 | Zhang | G06V 10/454 |
| 2022/0287218 | A1* | 9/2022 | Yuasa | B60K 31/00 |
| 2022/0297718 | A1* | 9/2022 | Yu | B60W 60/001 |
| 2023/0031053 | A1* | 2/2023 | Kodama | A01B 69/008 |
| 2023/0380323 | A1* | 11/2023 | Koyama | G05D 1/229 |
| 2023/0382370 | A1* | 11/2023 | Maejima | B60W 50/14 |
| 2023/0394893 | A1* | 12/2023 | Watanabe | G05D 1/0282 |
| 2023/0403976 | A1* | 12/2023 | Tanaka | A01B 69/008 |

* cited by examiner

ROUTE GENERATION METHOD, ROUTE GENERATION SYSTEM, AND ROUTE GENERATION PROGRAM

CROSS-REFERENCE

This application claims foreign priority of JP2022-144447 filed Sep. 12, 2022, the disclosure of which is hereby incorporated by reference in its entirety.

TECHNICAL FIELD

The present invention relates to a route generation method, a route generation system, and a route generation program that generate a target route that causes a work vehicle to travel autonomously in a field.

BACKGROUND ART

Conventionally, a technique is known that generates a target route that causes a work vehicle to travel autonomously in a field. For example, a technique is known that, when an operator boards a work vehicle and performs a registration operation that registers a teaching start point (reference start point) and a teaching end point (reference end point) while performing teaching travel in a field, registers a line segment connecting the reference start point and the reference end point as a reference line, and then generates a straight route (target route) that is parallel to the reference line (for example, see Patent Document 1).

PRIOR ART DOCUMENT

Patent Document

Patent Document 1: Japanese Unexamined Patent Application Publication No. 2008-067617

SUMMARY OF INVENTION

Technical Problem

However, in a teaching operation that generates a target route, the operator can sometimes perform predetermined work (such as planting work or reaping work) while the work vehicle is performing teaching travel. When a target route is generated while the work vehicle is performing predetermined work, it is easy for the operator to forget to perform operations that register a reference start point and a reference end point. In this case, because a reference line and a target route are not generated, the operator needs to perform teaching travel again. In this way, the conventional technique has a problem that the workability of the work that generates a target route is low.

An object of the present invention is to provide a route generation method, a route generation system, and a route generation program that are capable of improving the workability of work that generates a target route that causes a work vehicle to travel autonomously in a field.

Solution to Problem

A route generation method according to the present invention is a route generation method that generates a target route for causing a work vehicle to travel autonomously in a field. The route generation method executes the steps of: acquiring position information of a predetermined position of the work vehicle in the field; registering the predetermined position as a reference point when the work vehicle has traveled a predetermined distance from the predetermined position, or when a predetermined time has elapsed since the work vehicle started to travel from the predetermined position; and generating the target route based on the reference point.

A route generation system according to the present invention is a route generation system that generates a target route for causing a work vehicle to travel autonomously in a field. The route generation system includes an acquisition processing unit, a registration processing unit, and a generation processing unit. The acquisition processing unit acquires position information of a predetermined position of the work vehicle in the field. The registration processing unit registers the predetermined position as a reference point when the work vehicle has traveled a predetermined distance from the predetermined position, or when a predetermined time has elapsed since the work vehicle started to travel from the predetermined position. The generation processing unit generates the target route based on the reference point.

A route generation program according to the present invention is a route generation program that generates a target route for causing a work vehicle to autonomous travel in a field. The route generation program causes one or more processors to execute the steps of: acquiring position information of a predetermined position of the work vehicle in the field; registering the predetermined position as a reference point when the work vehicle has traveled a predetermined distance from the predetermined position, or when a predetermined time has elapsed since the work vehicle started to travel from the predetermined position; and generating the target route based on the reference point.

Advantageous Effects of Invention

According to the present invention, it is possible to provide a route generation method, a route generation system, and a route generation program that are capable of improving the workability of work that generates a target route that causes a work vehicle to travel autonomously in a field.

DESCRIPTION OF EMBODIMENTS

The embodiment described below is a specific example that embodies the present invention, and is not intended to limit the technical scope of the present invention.

The autonomous travel system according to an embodiment of the present invention includes a work vehicle 10, a satellite (not shown), and a base station (not shown). In the present embodiment, a case where the work vehicle 10 is a rice transplanter will be described as an example. Note that, as other embodiments, the work vehicle 10 may be a tractor, a combine, a construction machine, a snowplow, or the like. The work vehicle 10 performs predetermined work (such as planting work) while traveling along a target route R in a field F (see FIG. 4) according to operations performed by an operator (user). More specifically, the work vehicle 10 performs straight travel on the target route R according to automatic steering and makes turns according to manual steering (driving operations) performed by the operator. The work vehicle 10 travels in the field F and performs work while switching between autonomous travel on the straight routes and manual travel on the turning routes. The target route R may be generated in advance and stored as route data based on an operation by the operator.

Figure 4:
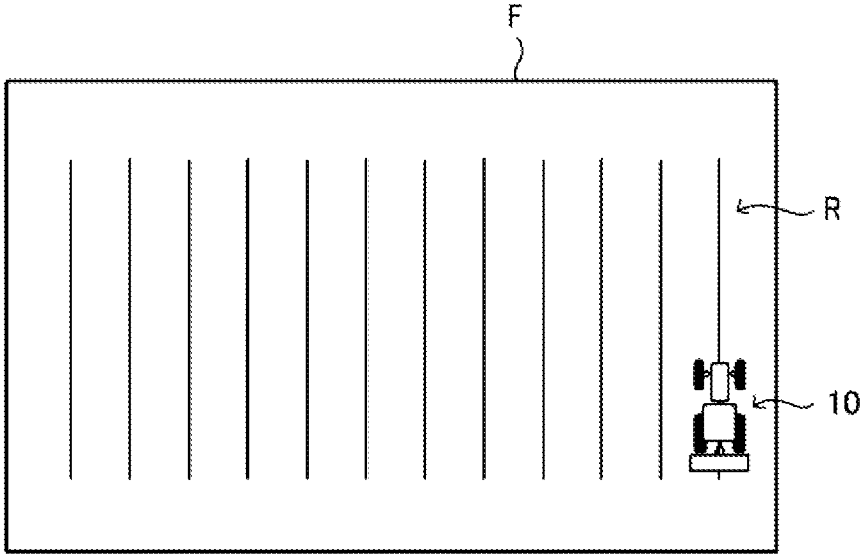
FIG. 4 is a diagram illustrating an example of a target route of a work vehicle according to an embodiment of the present invention.

The work vehicle 10, for example, travels in the field F illustrated in FIG. 4 by repeating straight travel and turning travel until the work is completed. The plurality of straight routes are substantially parallel to each other. The target route R illustrated in FIG. 4 is an example, and the target route R is appropriately determined according to the size of the work vehicle 10, the size of the work machine 14, the content of the work, the shape of the field F, and the like.

The autonomous travel system may include an operation terminal (such as a tablet terminal or a smartphone) that is operated by the operator. The operation terminal can communicate with the work vehicle 10 via a communication network such as a cellular telephone line network, a packet line network, or a wireless LAN. For example, the operator operates the operation terminal and performs operations that register various types of information (such as work vehicle information, field information, and work information) and the like. Furthermore, the operator is able to confirm, at a position away from the work vehicle 10, the travel status, the work status, and the like of the work vehicle 10 by a travel path that is displayed on the operation terminal.

[Work Vehicle 10]

Figure 1:
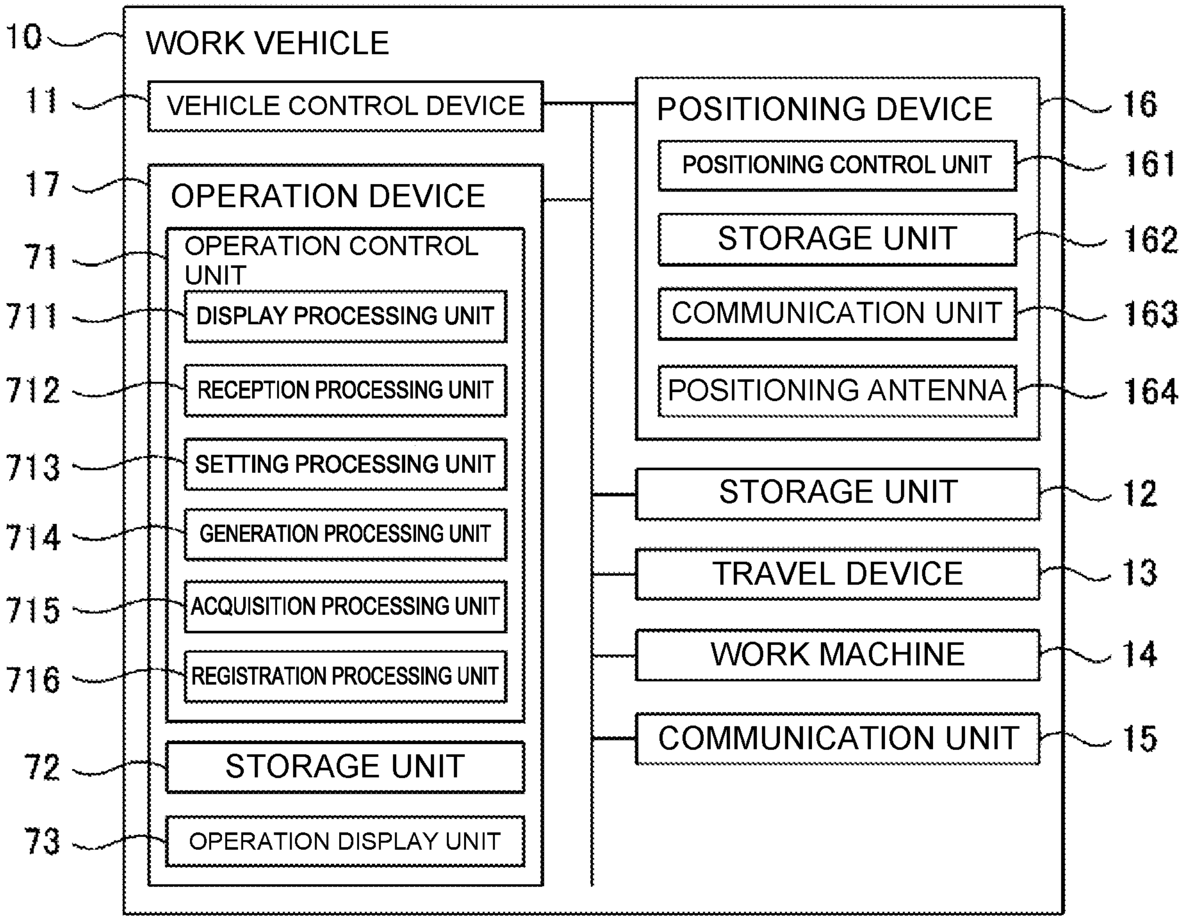
FIG. 1 is a block diagram illustrating a configuration of a work vehicle according to an embodiment of the present invention.

As illustrated in FIGS. 1 and 2, the work vehicle 10 is provided with a vehicle control device 11, a storage unit 12, a travel device 13, a work machine 14, a communication unit 15, a positioning device 16, and an operation device 17. The vehicle control device 11 is electrically connected to the storage unit 12, the travel device 13, the work machine 14, the positioning device 16, the operation device 17, and the like. The vehicle control device 11 and the positioning device 16 may be capable of performing wireless communication.

Furthermore, the vehicle control device 11 and the operation device 17 may be capable of performing wireless communication.

Figure 2A:
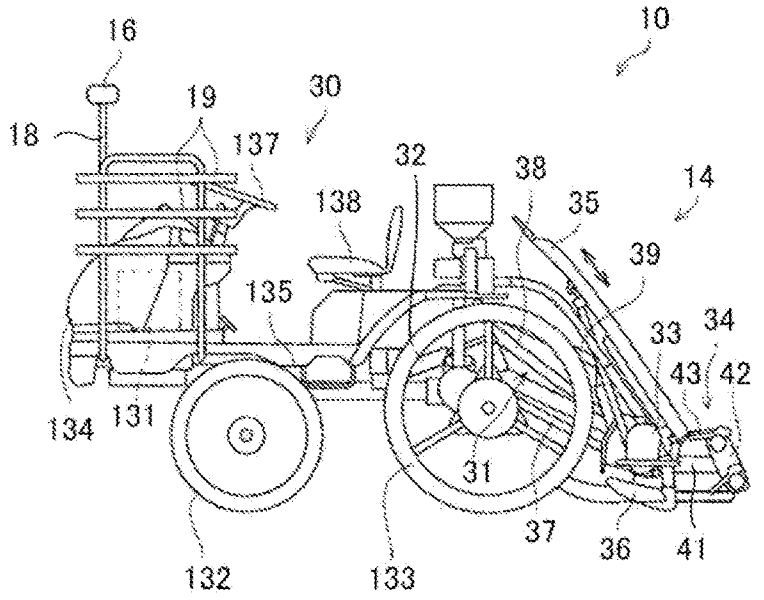
FIG. 2A is a side view illustrating an example of a work vehicle according to an embodiment of the present invention.
Figure 2B:
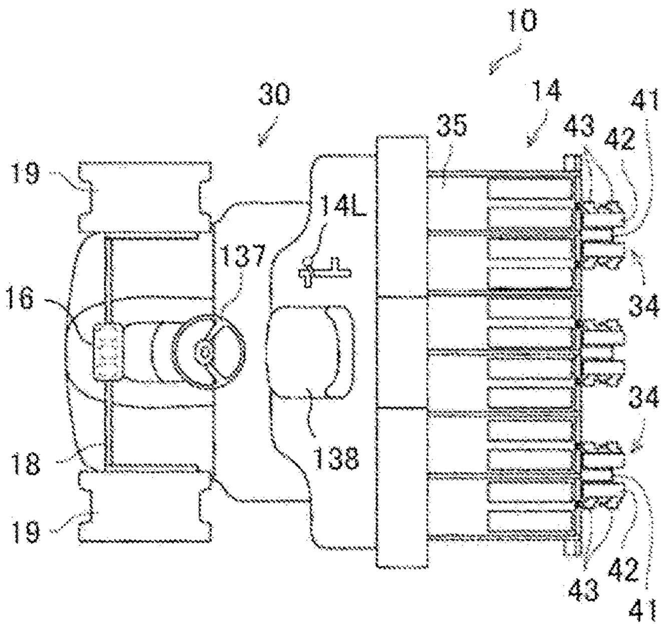
FIG. 2B is a top view illustrating an example of a work vehicle according to an embodiment of the present invention.

First, a rice transplanter, which is an example of the work vehicle 10, will be described with reference to FIGS. 2A and 2B. FIG. 2A is a side view of the work vehicle 10 (rice transplanter), and FIG. 2B is a plan view of the work vehicle 10. The work vehicle 10 includes a vehicle body portion 30, a pair of right and left front wheels 132, a pair of right and left rear wheels 133, a work machine 14 (planting unit), and the like.

An engine (drive unit) 131 is disposed inside a hood 134 arranged in a front portion of the vehicle body portion 30. The power generated by the engine 131 is transmitted to the front wheels 132 and the rear wheels 133 via a transmission case 135. The power transmitted via the transmission case 135 is also transmitted to the work machine 14 via a PTO shaft 37 disposed in a rear portion of the vehicle body portion 30. The PTO shaft 37 is configured such that the power is transmitted to it via a planting clutch (working clutch) (not shown). A driver's seat 138 on which the operator boards is provided in a position between the front wheels 132 and the rear wheels 133 in a front-rear direction of the vehicle body portion 30.

Operation tools such as a steering wheel 137, a main speed change lever 13L (see FIG. 3), and a planting clutch lever 14L (see FIG. 2B) are arranged in front of the driver's seat 138. The steering wheel 137 is an operation tool for changing the steering angle of the work vehicle 10. The main speed change lever 13L is configured so that positions that at least include “forward”, “backward”, “neutral” and “seedling transfer” can be selected. When the main speed change lever 13L is operated to the “forward” position, the power is transmitted so that the front wheels 132 and the rear wheels 133 rotate in a direction that causes the work vehicle 10 to move forward. When the main speed change lever 13L is operated to the "backward" position, the power is driven so that the front wheels 132 and the rear wheels 133 rotate in a direction that causes the work vehicle 10 to move backward.

When the main speed change lever 13L is operated to the "neutral" position, the power transmitted to the front wheels 132 and the rear wheels 133 is cut off. When the main speed change lever 13L is operated to the "seedling transfer" position, the power transmitted to the front wheels 132, the rear wheels 133 and the PTO shaft 37 is cut off. Furthermore, by operating the planting clutch lever 14L, switching is possible between a transmission state in which the planting clutch transmits power to the PTO shaft 37 (that is, the work machine 14) and a cut-off state in which the planting clutch does not transmit power to the PTO shaft 37 (that is, the work machine 14).

The work machine 14 is joined to the rear of the vehicle body portion 30 via a raising/lowering link mechanism 31. The raising/lowering link mechanism 31 is configured by a parallel link structure including a top link 39, a lower link 38, and the like. A raising/lowering cylinder (raising/lowering device) 32 is joined to the lower link 38. The entire work machine 14 may be vertically raised and lowered by extending and contracting the raising/lowering cylinder 32. As a result, the height of the work machine 14 may be changed between a lowered position in which the work machine 14 is lowered to perform planting work, and a raised position in which the work machine 14 is raised and does not perform planting work. The raising/lowering cylinder 32 is a hydraulic cylinder, but an electric cylinder may also be used. Furthermore, a configuration may be used in which the work machine 14 is raised and lowered by an actuator other than a cylinder.

The work machine 14 (planting unit) includes a planting input case 33, a plurality of planting units 34, a seedling stand 35, a plurality of floats 36, and the like.

Each of the planting units 34 includes a planting transmission case 41 and a rotary case 42. The power is transmitted to the planting transmission case 41 via the PTO shaft 37 and the planting input case 33. Each of the planting transmission cases 41 has the rotary case 42 mounted on both sides thereof in a vehicle width direction. Two planting claws 43 are mounted side-by-side on each of the rotary cases 42 in the forward direction of the work vehicle 10. The two planting claws 43 perform planting of a single row.

As illustrated in FIG. 2A, the seedling stand 35 is disposed in front of and above the planting units 34 and is configured such that seedling mats can be placed thereon. The seedling stand 35 is configured to be laterally movable (slidable in the lateral direction) in a reciprocating manner. Furthermore, the seedling stand 35 is configured so as to be capable of intermittently and vertically conveying the seedling mats to the downward side at the ends of the reciprocating movement of the seedling stand 35. This configuration enables the seedling stand 35 to supply seedlings from the seedling mats to each of the planting units 34. Accordingly, the work vehicle 10 may successively supply seedlings to each of the planting units 34 to continuously perform planting of the seedlings.

The float 36 illustrated in FIG. 2A is provided in a lower portion of the work machine 14 so that the lower surface is disposed so as to come into contact with the ground surface. The float 36 comes into contact with the ground to level the rice field surface before seedlings are planted. Furthermore, the float 36 is provided with a float sensor (not shown) that detects a swing angle of the float 36. The swing angle of the float 36 corresponds to the distance between the rice field surface and the work machine 14. The work vehicle 10 causes the raising/lowering cylinder 32 to move based on the swing angle of the float 36 and raises and lowers the work machine 14 up and down so as to maintain work machine 14 at a constant height above the ground.

Spare seedling stands 19 are provided outside of the hood 134 in the vehicle width direction, and are capable of being loaded with a seedling box that accommodates spare mat seedlings. The upper portions of the pair of left and right spare seedling stands 19 are joined to each other by a coupling frame 18 that extends in the vertical direction and the vehicle width direction. The positioning device 16 is disposed on the center of the coupling frame 18 in the vehicle width direction.

As shown in FIG. 1, the positioning device 16 includes a positioning control unit 161, a storage unit 162, a communication unit 163, a positioning antenna 164, and the like.

The positioning control unit 161 is a computer system provided with one or more processors and storage memory, such as a non-volatile memory and a RAM. The storage unit 162 is a non-volatile memory or the like that stores a positioning control program for causing the positioning control unit 161 to execute positioning processing, and data such as positioning information and movement information. For example, the positioning control program is non-transiently recorded on a computer-readable recording medium such as a CD or a DVD, which is read by a predetermined reading device (not shown) and then stored in the storage unit 162. Note that, the positioning control program may be downloaded from a server (not shown) to the positioning device 16 via a communication network and then stored in the storage unit 162.

The communication unit 163 is a communication interface for connecting the positioning device 16 to a communication network in a wired or wireless fashion, and executing data communication according to a predetermined communication protocol with an external apparatus such as a base station server via the communication network.

The positioning antenna 164 is an antenna that receives radio waves (a GNSS signal) transmitted from a satellite.

The positioning control unit 161 calculates the current position of the work vehicle 10 based on the GNSS signal that the positioning antenna 164 receives from the satellite. For example, in a case where the work vehicle 10 travels autonomously in the field F, when the positioning antenna 164 receives radio waves (such as a transmission time and orbit information) transmitted from each of a plurality of satellites, the positioning control unit 161 calculates a distance between the positioning antenna 164 and each satellite, and calculates the current position (latitude and longitude) of the work vehicle 10 based on the calculated distances. Alternatively, the positioning control unit 161 may perform positioning using the real-time kinematic method (the RTK-GNSS positioning method (RTK method)), which calculates the current position of the work vehicle 10 using correction information corresponding to a base station (reference station) near the work vehicle 10. In this way, the work vehicle 10 uses positioning information based on the RTK method to perform autonomous travel. The current position of the work vehicle 10 may be the same position as the positioning position (for example, the position of the positioning antenna 164), or may be a position that is offset from the positioning position.

The communication unit 15 is a communication interface for connecting the work vehicle 10 to a communication network in a wired or wireless fashion, and executing data communication according to a predetermined communication protocol with an external apparatus (such as an operation terminal) via the communication network.

The storage unit 12 is a non-volatile storage unit such as a hard disk drive (HDD) or a solid state drive (SSD) that stores various types of information. The storage unit 12 stores a control program such as an autonomous travel program that causes the vehicle control device 11 to execute autonomous travel processing. For example, the autonomous travel program is non-transiently recorded on a computer-readable recording medium such as a CD or a DVD, which is read by a predetermined reading device (not shown) and then stored in the storage unit 12. Note that, the autonomous travel program may be downloaded from a server (not shown) to the work vehicle 10 via a communication network and then stored in the storage unit 12. The storage unit 12 may also store data of the target route R that is generated in the operation device 17.

The operation device 17 is an apparatus operated by the operator that boards the work vehicle 10, and displays various types of information and receives operations from the operator. More specifically, the operation device 17 displays various setting screens and receives various setting operations from the operator, and displays information relating to the work vehicle 10 during travel. A specific configuration of the operation device 17 will be described below.

The vehicle control device 11 includes a control apparatuses such as a CPU, a ROM, and a RAM. The CPU is a processor that executes various types of arithmetic processing. The ROM is a non-volatile storage unit that stores in advance control programs such as a BIOS and an OS for causing the CPU to execute various types of arithmetic processing. The RAM is a volatile or non-volatile storage unit that stores various types of information, and is used as a temporary storage memory (work area) for the various types of processing executed by the CPU. Further, the vehicle control device 11 controls the work vehicle 10 as a result of the CPU executing the various control programs stored in advance in the ROM or the storage unit 12. Furthermore, the vehicle control device 11 executes various types of processing according to the autonomous travel program using the CPU.

More specifically, the vehicle control device 11 controls the travel of the work vehicle 10. For example, the vehicle control device 11 causes the work vehicle 10 to manually travel based on operations from the user (manual steering) when the travel mode of the work vehicle 10 is set to manual travel (manual travel mode). For example, the vehicle control device 11 acquires operation information corresponding to driving operations by the operator, such as steering wheel operations, speed change operations, shift operations, accelerator pedal operations, brake operations, and the like, and causes the travel device 13 to execute travel motions based on the operation information.

Furthermore, when the travel mode of the work vehicle 10 is set to autonomous travel (autonomous travel mode), the vehicle control device 11 causes the work vehicle 10 to travel autonomously based on the position information (positioning information) representing the current position of the work vehicle 10 that is positioned by the positioning control unit 161. For example, when the work vehicle 10 satisfies an autonomous travel start condition and acquires a travel start instruction from the operator, the vehicle control device 11 causes the work vehicle 10 to start performing autonomous travel based on the positioning information. Moreover, the vehicle control device 11 causes the work vehicle 10 to travel autonomously along the target route R (straight route) that has been generated in advance.

In addition, the vehicle control device 11 is capable of causing the work vehicle 10 to travel autonomously along the target route R (straight route) generated according to a route generation mode that has been set to one of a plurality of route generation modes (details below). For example, when the operator selects a first route generation mode ("point A+point B" mode), the vehicle control device 11 causes the work vehicle 10 to travel autonomously along the target route R that has been generated by the first route generation mode. Furthermore, for example, when the operator selects a second route generation mode ("point A+vehicle azimuth angle" mode), the vehicle control device 11 causes the work vehicle 10 to travel autonomously along the target route R that has been generated by the second route generation mode. Moreover, for example, when the operator selects a third route generation mode ("point A+set azimuth angle" mode), the vehicle control device 11 causes the work vehicle 10 to travel autonomously along the target route R that has been generated by the third route generation mode. The setting processing of the route generation mode is executed in the operation device 17.

The autonomous travel system according to the present embodiment has the three route generation modes (the first route generation mode, the second route generation mode, and the third route generation mode). However, the present invention is not limited thereto. The details of the route generation modes will be described below.

Moreover, when the work vehicle 10 arrives at the end of a straight route, the vehicle control device 11 switches the travel mode to manual travel. The vehicle control device 11 may switch the travel mode to manual travel when it has determined that the work vehicle 10 has reached an end point, or it may switch the travel mode to manual travel in response to an operation from the operator. When the travel mode is switched to manual travel, for example, the operator performs turning travel (manual travel) of the work vehicle 10 using manual steering.

As described above, the vehicle control device 11 switches the travel mode according to an operation made by the operator with respect to the operation device 17, and causes the work vehicle 10 to travel autonomously on straight routes (target route R) by automatic steering and manually travel on turning routes by manual steering.

Here, the target route R (straight routes) on which the work vehicle 10 autonomously travels is generated based on work performed by the operator (route generation work). In the route generation work of the conventional technique, if the operator forgets to register a reference start point (point A) and a reference end point (point B) while causing the work vehicle 10 to perform teaching travel, the target route R is not generated and the operator has to perform teaching travel again. In this way, the conventional technique has a problem that the workability of the work that generates the target route R is low. In contrast, according to the configuration of the present embodiment, as described below, it is possible to improve the workability of the generation work of the target route R. A specific configuration of the operation device 17 will be described below.

[Operation Device 17]

As illustrated in FIG. 1, the operation device 17 includes an operation control unit 71, a storage unit 72, an operation display unit 73, and the like. The operation device 17 may be an apparatus that can be attached to or detached from the work vehicle 10. Furthermore, the operation device 17 may be a portable terminal (a tablet device, a smartphone, or the like) that can be carried by the operator. Moreover, the operation device 17 is connected so as to be capable of communicating with the vehicle control device 11 in a wired or wireless fashion.

The operation display unit 73 is a user interface that includes a display unit such as a liquid crystal display an organic EL display that displays various types of information, and an operation unit such as operation buttons or a touch panel that receives operations. The operation display unit 73 displays various setting screens and work screens in response to instructions from the operation control unit 71. In addition, the operation display unit 73 receives operations from the user on the setting screens or the work screens.

Furthermore, the operation unit includes an autonomous travel button that is used by the operator to issue a travel start instruction when autonomous travel of the work vehicle 10 is to be started, an offset button that is used to perform an offset operation (correction operation) to correct a position error between the work vehicle 10 and the target route R, and a plurality of selection buttons that are used to perform selection operations on the setting screens and the work screens (these are not shown).

Figure 3:
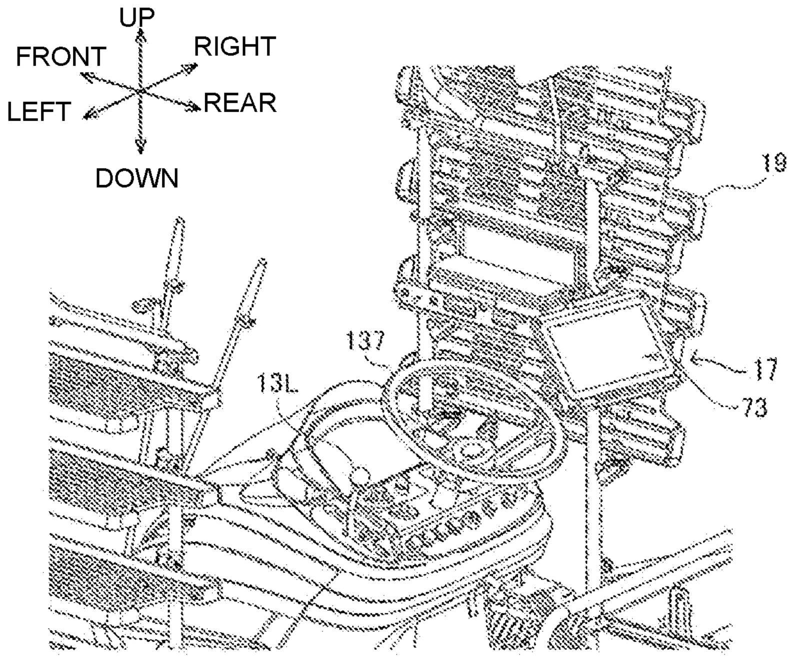
FIG. 3 is an external view illustrating an example of an operation device according to an embodiment of the present invention.

For example, as shown in FIG. 3, the operation device 17 is installed near the steering wheel 137 in the driver's seat. The operator can operate the operation device 17 by boarding the work vehicle 10.

The storage unit 72 is a non-volatile storage unit such as an HDD or an SSD that stores various types of information. The storage unit 72 stores a control program such as a route generation program for causing the operation device 17 to execute route generation processing (see FIGS. 10 and 11) described below. For example, the route generation program is non-transiently recorded on a computer-readable recording medium such as a CD or a DVD, which is read by a predetermined reading device (not shown) and then stored in the storage unit 72. Note that, the route generation program may be downloaded from a server (not shown) to the operation device 17 via a communication network and then stored in the storage unit 72. Furthermore, the route generation program may be stored in the storage unit 12 of the work vehicle 10. Moreover, the storage unit 72 may store data of the target route R that is generated in the operation device 17.

The operation control unit 71 includes control apparatuses such as a CPU, a ROM, and a RAM. The CPU is a processor that executes various types of arithmetic processing. The ROM is a non-volatile storage unit that stores in advance control programs such as a BIOS and an OS for causing the CPU to execute various types of arithmetic processing. The RAM is a volatile or non-volatile storage unit that stores various types of information, and is used as a temporary storage memory (work area) for the various types of processing executed by the CPU. Further, the operation control unit 71 controls the operation device 17 as a result of the CPU executing various control programs stored in advance in the ROM or the storage unit 72.

More specifically, as illustrated in FIG. 1, the operation control unit 71 includes various processing units such as a display processing unit 711, a reception processing unit 712, a setting processing unit 713, a generation processing unit 714, an acquisition processing unit 715, and a registration processing unit 716. The operation device 17 functions as each of the various processing units as a result of the CPU executing the various types of processing according to the route generation program. Furthermore, some or all of the processing units may be configured by an electronic circuit. The route generation program may be a program that causes a plurality of processors to function as the processing units.

The display processing unit 711 causes the operation display unit 73 to display various types of information. For example, the display processing unit 711 causes the operation display unit 73 to display the setting screens and work screens (such as FIGS. 5, 6, 9, 12, and 14) on which various settings are made.

The reception processing unit 712 receives various operations from the operator. For example, the reception processing unit 712 receives, on the setting screens and the work screens, operations for generating the target route R, that is, various operations from the operator relating to the route generation work.

The setting processing unit 713 specifies a route generation mode among the plurality of route generation modes. The plurality of route generation modes are route generation mode that generate the target route R based on a reference point (such as a point A) that is set to a predetermined position in the field F.

The plurality of route generation modes according to the present embodiment include, for example, the first route generation mode ("point A+point B" mode) in which the target route R is generated based on a reference line L1 that passes through two reference points (point A and point B) that are each set to two positions of the work vehicle 10 in the field F; the second route generation mode ("point A+vehicle azimuth angle" mode) in which the target route R is generated based on a reference line L1 that passes through a reference point (point A) that is set to one position of the work vehicle 10 in the field F, and extends in the direction of an azimuth of the work vehicle 10 (vehicle azimuth); and a third route generation mode ("point A+set azimuth angle" mode) in which the target route R is generated based on a reference line L1 that passes through a reference point (point A) that is set to one position of the work vehicle 10 in the field F, and extends in the direction of a set azimuth angle (set angle) that has been set according to a setting operation (angle input operation) by the operator.

Figure 5A:
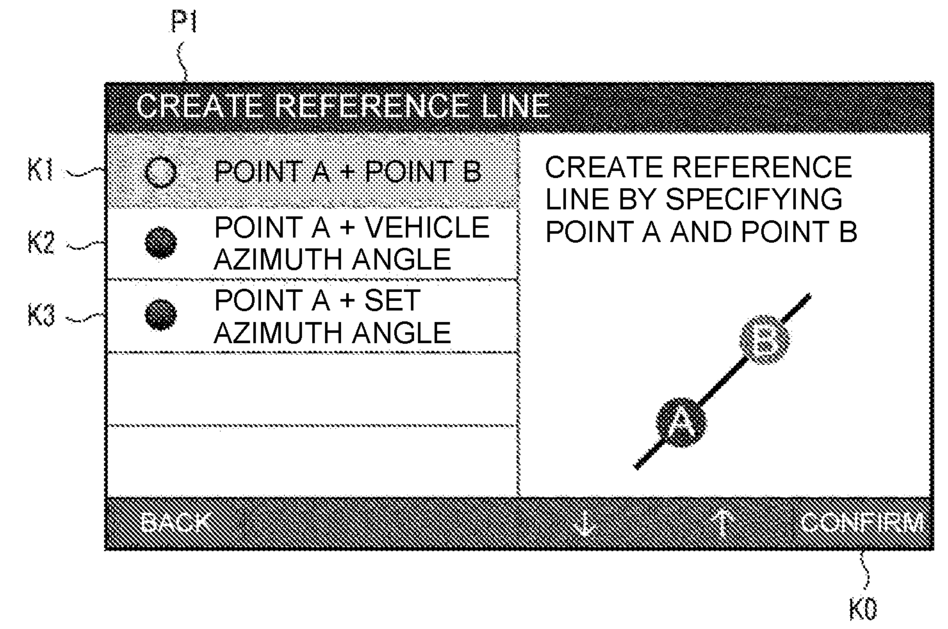
FIG. 5A is a diagram illustrating an example of a setting screen that is displayed on an operation device according to an embodiment of the present invention.

The operator can select one of the route generation modes among the plurality of route generation modes. FIG. 5A illustrates an example of a setting screen P1. For example, when the operator selects a work setting of a menu screen (not shown) when performing the route generation work, the display processing unit 711 causes the operation display unit 73 to display the setting screen P1 that receives a selection operation of the route generation mode from the operator.

On the setting screen P1, "point A+point B" (setting item K1) corresponding to the first route generation mode, "point A+vehicle azimuth angle" (setting item K2) corresponding to the second route generation mode, and "point A+set azimuth angle" (setting item K3) corresponding to the third route generation mode are each displayed in a selectable manner. On the setting screen P1, the operator selects one of the route generation modes among the first route generation mode, the second route generation mode, and the third route generation mode.

The setting processing unit 713 specifies the route generation mode among the plurality of route generation modes that has been selected by the user. Then, the generation processing unit 714 generates the target route R using the route generation mode that has been specified by the setting processing unit 713. More specifically, the generation processing unit 714 generates a target route R that includes a reference line L1 that passes through a reference point (point A).

Specific Examples of Route Generation Methods

Next, specific examples of the generation methods of the target route R in each of the first route generation mode, the second route generation mode, and the third route generation mode will be described.

[First Route Generation Mode]

When the operator selects "point A+point B" (setting item K1) and presses a confirmation button K0 on the setting screen P1 (see FIG. 5A), the display processing unit 711 causes the operation display unit 73 to display a setting screen P2 (see FIG. 5B) that receives a selection operation of the manual/automatic mode ("manual registration", "automatic registration") from the operator. When the operator selects "manual registration" (selection item K11) on the setting screen P2 and presses the confirmation button K0, the reception processing unit 712 receives the selection operation from the operator, and the setting processing unit 713 specifies the first route generation mode (manual registration). Furthermore, when the operator selects "automatic registration" (selection item K12) on the setting screen P2 and presses the confirmation button K0, the reception processing unit 712 receives the selection operation from the operator, and the setting processing unit 713 specifies the first route generation mode (automatic registration).

When the setting processing unit 713 specifies the first route generation mode (manual registration), the display processing unit 711 causes the operation display unit 73 to display a work screen D1 (see FIG. 6A) on which a setting operation to set the reference line L1 is received from the operator.

Figure 6A:
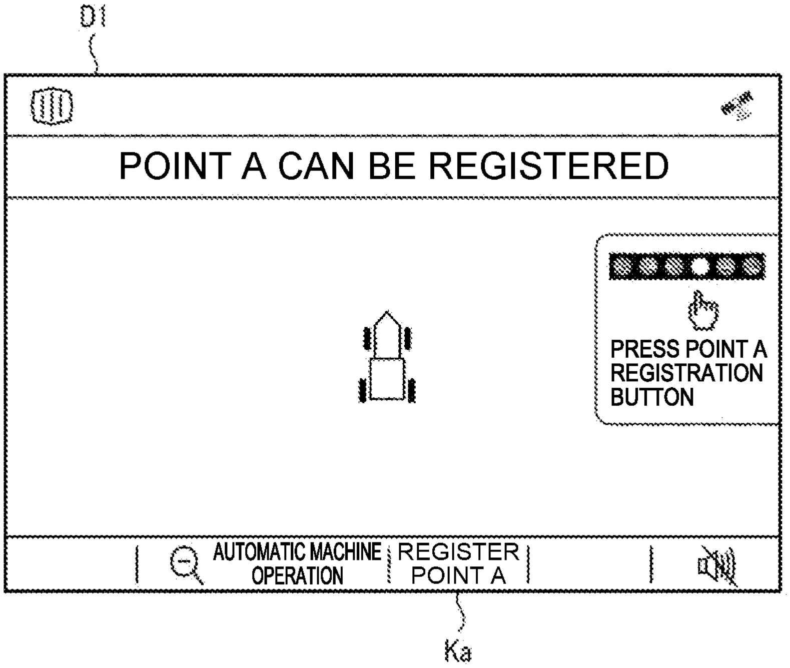
FIG. 6A is a diagram illustrating an example of a work screen that is displayed on an operation device according to an embodiment of the present invention.
Figure 6B:
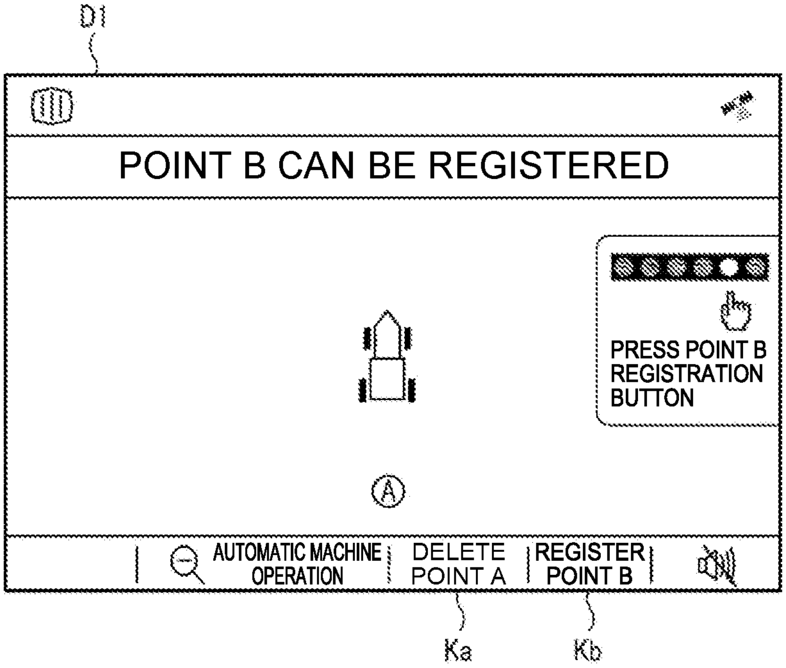
FIG. 6B is a diagram illustrating an example of a work screen that is displayed on an operation device according to an embodiment of the present invention.

In the first route generation mode with manual registration, the operator moves the work vehicle 10 to a desired position in the field F and presses a point A registration button Ka (see FIG. 6A). For example, the operator moves the work vehicle 10 to an outer peripheral end portion of the field F and presses the point A registration button Ka. When the operator presses the point A registration button Ka, the setting processing unit 713 registers the current position of the work vehicle 10 as a first reference point (point A). After the setting processing unit 713 registers point A, the display processing unit 711 causes the operation display unit 73 to display the work screen D1 (see FIG. 6B) that receives a registration operation of a second reference point (point B). The operator manually drives the work vehicle 10 in a direction (target direction) in which travel and work is to be performed by the work vehicle 10 (see FIG. 7A). More specifically, the operator causes the work vehicle 10 to perform straight travel in a direction that is parallel to a work direction (for example, a planting direction) that is traveled when the work vehicle 10 is working in the work area. When the work vehicle 10 is manually driven, the operator may lower the work machine 14 to allow the work vehicle 10 to perform planting work. Then, the operator presses a point B registration button Kb (see FIG. 6B) at a desired position (for example, an outer peripheral end portion of the field F). When the operator presses the point B registration button Kb, the setting processing unit 713 registers the current position of the work vehicle 10 as the second reference point (point B).

Figure 7A:
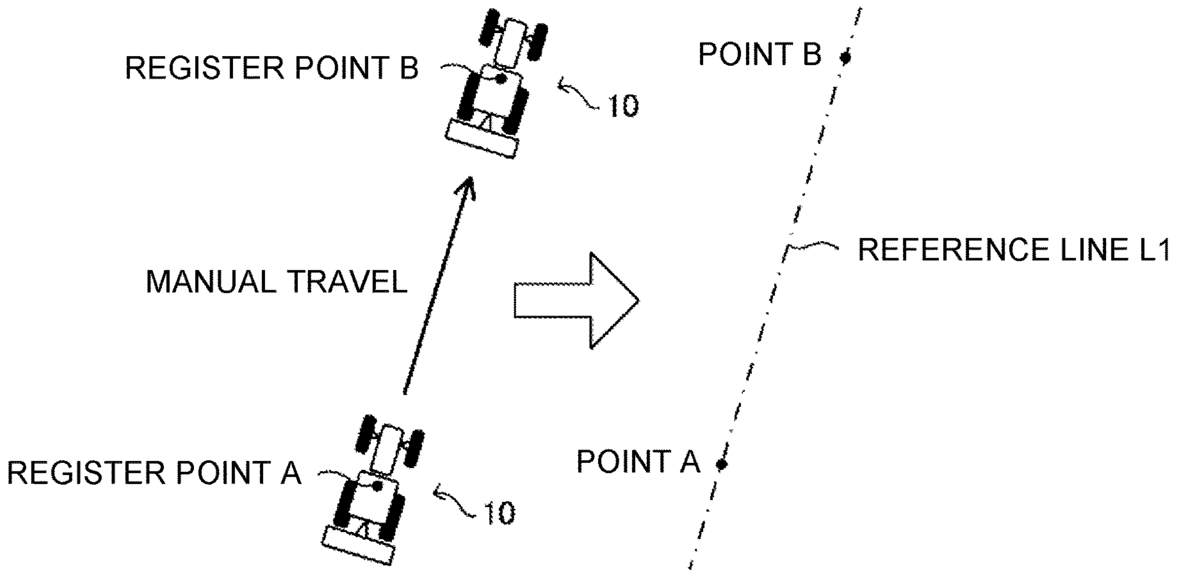
FIG. 7A is a diagram for describing a route generation method in a first route generation mode according to an embodiment of the present invention.

When the setting processing unit 713 acquires position information of point A and point B, it sets a straight line that passes through point A and point B as the reference line L1 (see FIG. 7A). The setting processing unit 713 may be capable of adjusting at least one of the position and the azimuth of the reference line L1 that has been created. For example, the setting processing unit 713 causes the work screen D1 to display the reference line L1 that has been created, and sets (registers) the reference line L1 when the registration operation is received from the operator. On the other hand, when the setting processing unit 713 receives an operation from the operator to change at least one of the position and the azimuth of the reference line L1 (for example, a touch operation on the screen), it adjusts at least one of the position and the azimuth of the reference line L1 according to the operation. When the setting processing unit 713 receives an operation to register point B, it may display a selection screen that allows the reference line L1 to be registered or adjusted. The generation processing unit 714 generates a travel route (target route R) including the reference line L1 and a plurality of straight lines that are parallel to the reference line L1. For example, the generation processing unit 714 generates the plurality of parallel straight lines based on a work width (horizontal width of the work machine 14) and a lap width (width overlapping adjacent worked areas) set in advance, which are spaced at equal intervals to the left and right of the reference line L1, or to either the left or right according to an operator instruction or a setting condition (see FIG. 7B). The generation processing unit 714 registers the generated target route R in the storage unit 72 and causes the operation display unit 73 to display the generated target route R.

In contrast, when the setting processing unit 713 specifies (see FIG. 5B) the first route generation mode (automatic registration), the operation control unit 71 automatically registers the first reference point (point A) and the second reference point (point B), and generates the target route R.

More specifically, the acquisition processing unit 715 acquires the position information of a predetermined position of the work vehicle 10. For example, the acquisition processing unit 715 acquires the position information of a position at which a predetermined motion of the work vehicle 10 is executed. The predetermined motion is, for example, a raising/lowering motion of the work machine 14, or a turning motion of the work vehicle 10. For example, when the operator performs an operation that moves the work vehicle 10 in the field F to a start position of the planting work and lowers the work machine 14 (first predetermined motion), the acquisition processing unit 715 acquires the position information of the current position of the work vehicle 10 (first position) at the time the operation was received. The acquisition processing unit 715 may acquire position information of the current position of the work vehicle 10 (first position) at the time it is detected that the floats 36 have made contact with the ground surface.

Furthermore, for example, when the operator performs an operation that turns the work vehicle 10 or raises the work machine 14 (second predetermined motion) after performing the planting work while causing the work vehicle 10 to manually travel on the first route of the planting work, the acquisition processing unit 715 acquires the position information of the position of the work vehicle 10 (second position) at the time the operation was received. The acquisition processing unit 715 may acquire the position information of the current position of the work vehicle 10 (second position) at the time a steering angle of the steering wheel 137 becomes greater than or equal to a predetermined angle, or it is detected that the floats 36 are no longer in contact with the ground surface.

The registration processing unit 716 registers the first position at which the first predetermined motion of the work vehicle 10 (such as a lowering motion of the work machine 14) was executed as the first reference point (point A), and registers the second position at which the second predetermined motion of the work vehicle 10 (such as a turning motion of the work vehicle 10 or a raising motion of the work machine 14) was executed as the second reference point (point B).

Figure 8A:
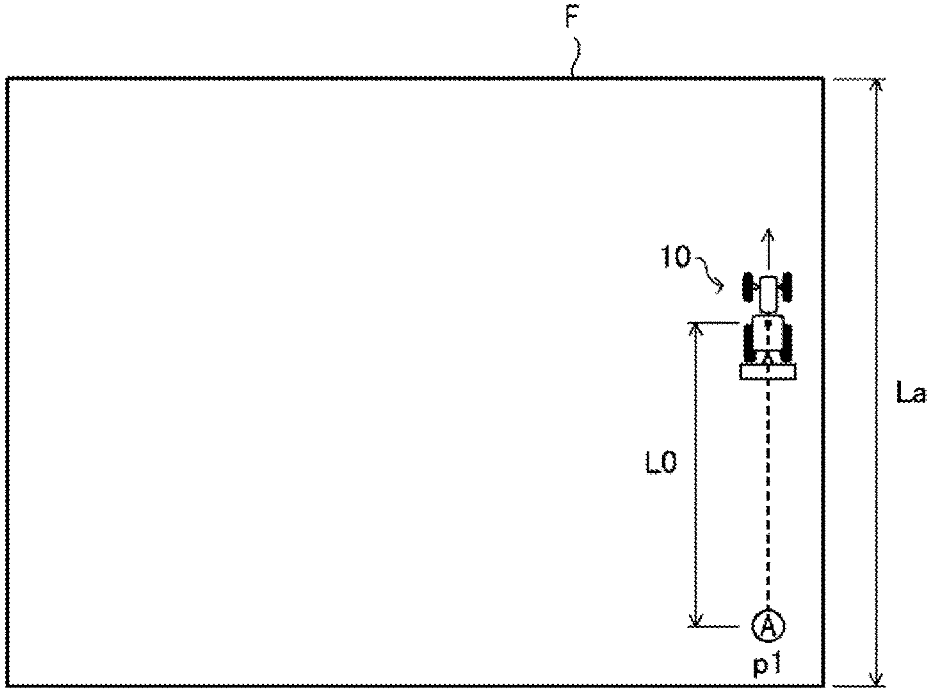
FIG. 8A is a diagram for describing a route generation method in a route generation mode according to an embodiment of the present invention.

Furthermore, the registration processing unit 716 may register the predetermined position as a reference point when the work vehicle 10 has traveled a predetermined distance from the predetermined position, or when a predetermined time has elapsed since the work vehicle 10 started to travel from the predetermined position. More specifically, the registration processing unit 716 registers the first position corresponding to the first predetermined motion as the first reference point (point A) when the work vehicle 10 has traveled a first predetermined distance from the first position, or when a first predetermined time has elapsed since the work vehicle 10 started to travel from the first position. For example, as shown in FIG. 8A, when the work machine 14 is lowered and a travel distance L0 of the work vehicle 10 from a position p1 (first position) of the work vehicle 10 at the time in which planting work became possible reaches the first predetermined distance, the registration processing unit 716 registers the position p1 as the first reference point (point A).

As another embodiment, when the work machine 14 is lowered and the first predetermined time has elapsed from the time in which planting work became possible, the registration processing unit 716 may register the position p1 as the first reference point (point A). Furthermore, when the work machine 14 is lowered and the travel distance L0 of the work vehicle 10 from the position p1 (first position) of the work vehicle 10 at the time in which planting work became possible reaches the first predetermined distance, and the work machine 14 is lowered and the first predetermined time has elapsed from the time in which planting work became possible, the registration processing unit 716 may register the position p1 as the first reference point (point A).

Figure 8B:
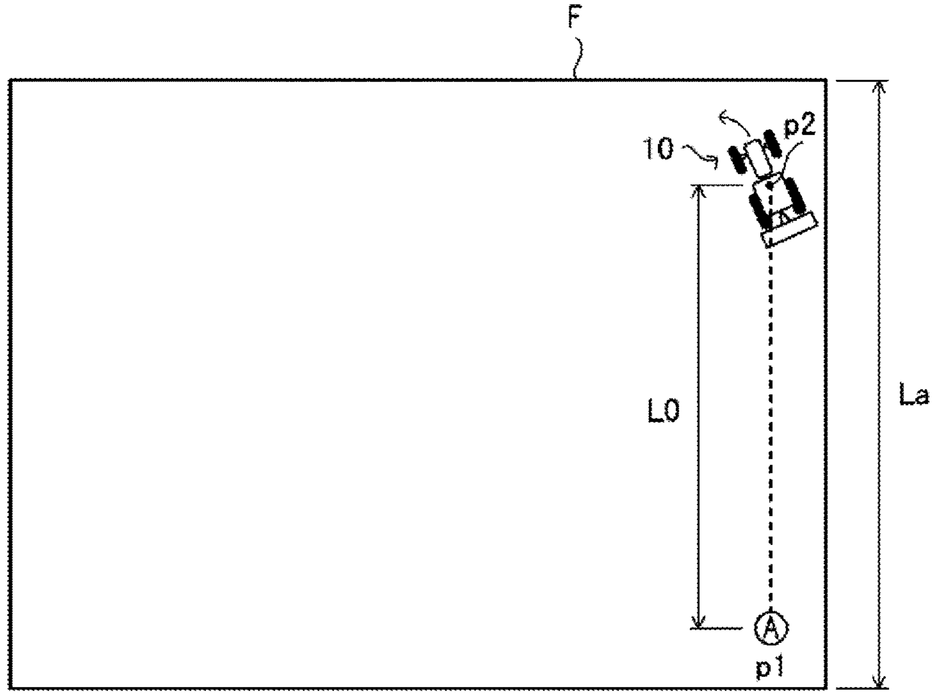
FIG. 8B is a diagram for describing a route generation method in a route generation mode according to an embodiment of the present invention.
Figure 9A:
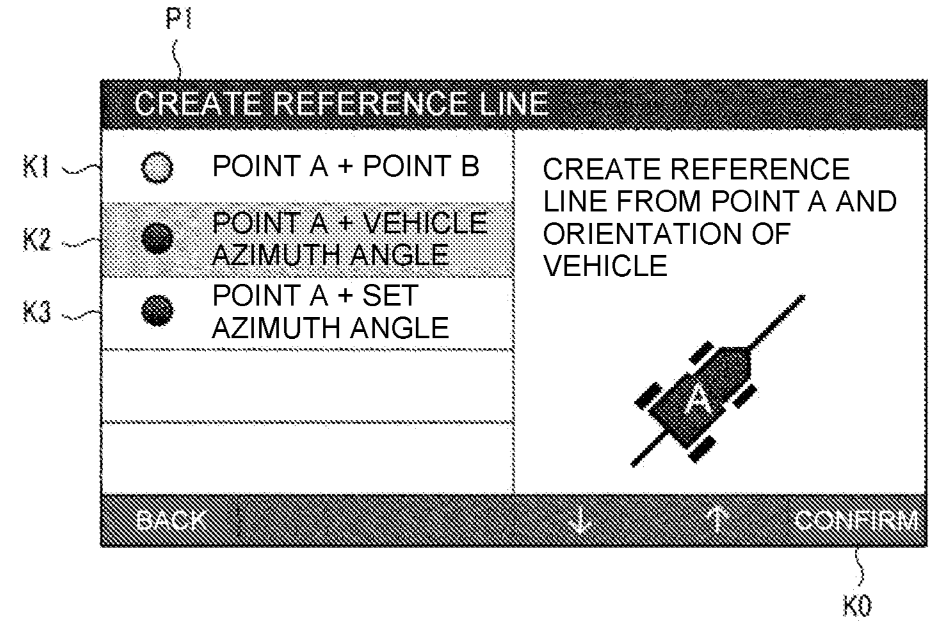
FIG. 9A is a diagram illustrating an example of a setting screen that is displayed on an operation device according to an embodiment of the present invention.
Figure 9B:
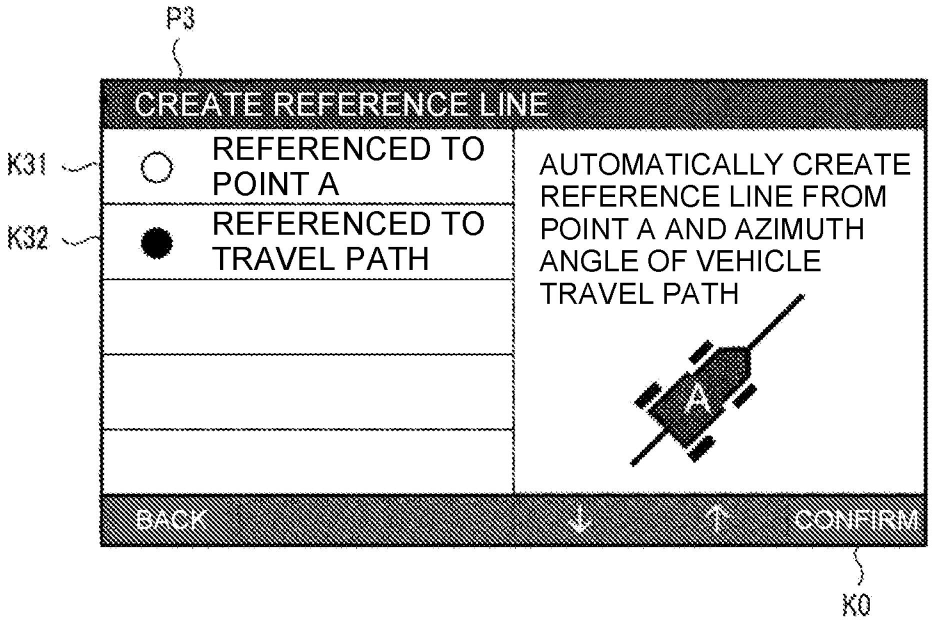
FIG. 9B is a diagram illustrating an example of a setting screen that is displayed on an operation device according to an embodiment of the present invention.

Moreover, the registration processing unit 716 may register the second position corresponding to the second predetermined motion as the second reference point (point B) when the work vehicle 10 has traveled a second predetermined distance from the first position, or when a second predetermined time has elapsed from the time the work vehicle 10 was at the first position. For example, as shown in FIG. 8B, when the work machine 14 is lowered and a travel distance L0 of the work vehicle 10 from the position p1 (first position) of the work vehicle 10 at the time in which planting work became possible reaches the second predetermined distance (note: second predetermined distance >first predetermined distance), the registration processing unit 716 registers a position p2 as the second reference point (point B).

As another embodiment, when the work machine 14 is lowered and the second predetermined time has elapsed from the time in which planting work became possible (note: second predetermined time >first predetermined time), the registration processing unit 716 may register the position p2 as the second reference point (point B). Furthermore, when the work machine 14 is lowered and a travel distance L0 of the work vehicle 10 from the position p1 (first position) of the work vehicle 10 at the time in which planting work became possible reaches the second predetermined distance, and the work machine 14 is lowered and the second predetermined time has elapsed from the time in which planting work became possible, the registration processing unit 716 may register the position p2 as the second reference point (point B).

The generation processing unit 714 generates the target route R based on the reference points registered by the registration processing unit 716. More specifically, the generation processing unit 714 generates the target route R based on the reference line L1 that passes through the first reference point (point A) and the second reference point (point B) corresponding to the positions at which the predetermined motions of the work vehicle 10 were executed.

The first predetermined distance is set to, for example, 1 to 3 m, and the second predetermined distance is set to, for example, 7 to 10 m. Moreover, the first predetermined distance and the second predetermined distance may be set according to the width La of the field F. For example, the first predetermined distance may be set to "La×0.2" (m), and the second predetermined distance may be set to "La×0.8" (m). In addition, the first predetermined time may be set to, for example, 2 to 3 seconds, and the second predetermined time may be set to, for example 5 seconds or more. Also, the first predetermined time and the second predetermined time may be set according to the width La of the field F and the vehicle speed of the work vehicle 10.

Furthermore, the predetermined motion includes at least one of a raising/lowering motion of the work machine 14, a motion that switches the forward direction of the work vehicle 10, an operation that changes the vehicle speed of the work vehicle 10, a motion that switches the working clutch, a motion that switches the side clutch of the rear wheels (ON/OFF motion), an ON/OFF motion of a seat switch, and work by a marker that generates the reference line L1 of the target route R of the subsequent journey or an operation that stores the marker in a storage position. Moreover, the first predetermined motion and the second predetermined motion may be the same type of motion (for example, a raising/lowering motion of the work machine 14), or may be different types of motions (for example, a raising/lowering motion of the work machine 14 and a switching motion of the forward direction). The work by the marker is, for example, a motion (marker motion) that draws a marking that indicates the travel route of the subsequent journey in the field F using the marker (by marking a track or groove in the field F), and the motion that stores the marker in the storage position is a motion that stores the marker in the storage position after the marker motion is completed. In addition, as another embodiment, the work by the marker may be work that sets the position in which the marking has been drawn to be the travel route (reference line L1) of the next journey.

According to the first route generation mode, because it is possible to generate the target route R by using the reference line L1 that passes through two points (point A and point B) at both end portions of the field F, the work accuracy of the work vehicle 10 can be improved.

[Second Route Generation Mode]

When the operator selects "point A+vehicle azimuth angle" (setting item K2) and presses the confirmation button K0 on the setting screen P1 (see FIG. 9A), the display processing unit 711 causes the operation display unit 73 to display a setting screen P3 (see FIG. 9B) that receives a selection operation that specifies whether the reference line L1 is set referenced to point A, or the reference line L1 is set referenced to the travel path. When the operator selects "referenced to point A" (selection item K31) on the setting screen P3 and presses the confirmation button K0, the reception processing unit 712 receives the selection operation from the operator, and the setting processing unit 713 specifies the second route generation mode (referenced to point A). Furthermore, when the operator selects "referenced to travel path" (selection item K32) on the setting screen P3 and presses the confirmation button K0, the reception processing unit 712 receives the selection operation from the operator, and the setting processing unit 713 specifies the second route generation mode (referenced to travel path).

When the setting processing unit 713 specifies the second route generation mode (referenced to point A), the display processing unit 711 causes the operation display unit 73 to display the work screen D1 (see FIG. 6A) on which a setting operation to set the reference line L1 is received from the operator. The operator moves the work vehicle 10 to a desired position in the field F and presses the point A registration button Ka (see FIG. 6A). For example, the operator moves the work vehicle 10 to a work start position in the field F and presses the point A registration button Ka. When the operator presses the point A registration button Ka, the setting processing unit 713 registers the position of the work vehicle 10 (current position) as the reference point (point A). After point A is registered, the setting processing unit 713 sets a straight line that passes through point A and extends in a direction of the current azimuth of the work vehicle 10 (vehicle azimuth angle) as the reference line L1. In addition, the setting processing unit 713 sets the vehicle azimuth angle, which is an angle relative to a reference azimuth (such as north). The setting processing unit 713 may be capable of adjusting the azimuth of the reference line L1 that has been created. For example, the setting processing unit 713 causes the work screen D1 to display the reference line L1 that has been created, and sets (registers) the reference line L1 when the registration operation is received from the operator. On the other hand, when the setting processing unit 713 receives an operation from the operator to change the azimuth of the reference line L1 (for example, a touch operation on the screen), it adjusts the azimuth of the reference line L1 according to the operation. When the setting processing unit 713 receives an operation to register point A, it may display a selection screen that allows the reference line L1 to be registered or adjusted.

Figure 7B:
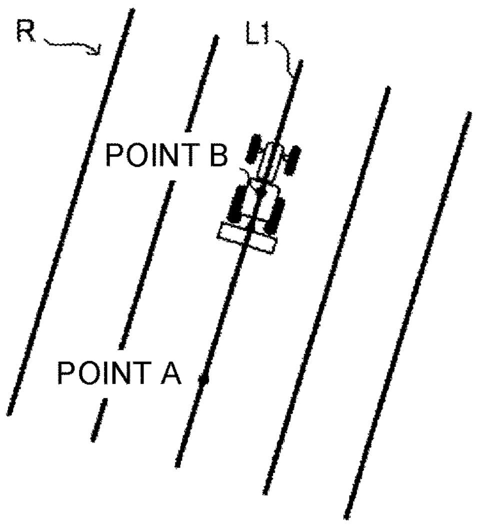
FIG. 7B is a diagram for describing a route generation method in a first route generation mode according to an embodiment of the present invention.

The generation processing unit 714 generates a travel route (target route R) including the reference line L1 and a plurality of straight lines that are parallel to the reference line L1 (see FIG. 7B). The generation processing unit 714 registers the generated target route R in the storage unit 72 and causes the operation display unit 73 to display the generated target route R.

In contrast, when the setting processing unit 713 specifies the second route generation mode (referenced to travel path), the operation control unit 71 generates the target route R based on the reference point (point A) and the travel path that the work vehicle 10 has traveled from the reference point (point A).

More specifically, the acquisition processing unit 715 acquires the position information of a predetermined position of the work vehicle 10. The acquisition processing unit 715 acquires a predetermined position of the work vehicle 10 in the same manner as in the “first route generation mode”. For example, the acquisition processing unit 715 acquires the position information of the position at which a predetermined motion of the work vehicle 10 (such as a raising/lowering motion of the work machine 14) is executed. For example, when the operator performs an operation that moves the work vehicle 10 in the field F to a start position of the planting work and lowers the work machine 14 (first predetermined motion), the acquisition processing unit 715 acquires the position information of the current position of the work vehicle 10 (first position) at the time the operation was received.

Furthermore, for example, when the operator performs an operation that turns the work vehicle 10 or raises the work machine 14 (second predetermined motion) after performing the planting work while causing the work vehicle 10 to manually travel on the first route of the planting work, the acquisition processing unit 715 acquires the vehicle azimuth angle based on the travel path that the work vehicle 10 has traveled from the first position. For example, the acquisition processing unit 715 acquires the vehicle azimuth angle when the work vehicle 10 has traveled the second predetermined distance from the first position, or when the second predetermined time has elapsed since the work vehicle 10 started to travel from the first position. Moreover, for example, the acquisition processing unit 715 acquires an average value of the vehicle azimuth angle corresponding to the travel path from the first position until the work vehicle 10 has traveled the second predetermined distance or until the second predetermined time has elapsed as the vehicle azimuth angle.

In addition, when the work vehicle 10 has traveled the first predetermined distance from the first position, or when the first predetermined time has elapsed since the work vehicle 10 started to travel from the first position, and then the second predetermined motion of the work vehicle 10 (such as a turning motion of the work vehicle 10, or a raising motion of the work machine 14) has been executed, the acquisition processing unit 715 acquires, referenced to the first position, an average value of the vehicle azimuth angle corresponding to the travel path from the first position to the second position, at which the second predetermined motion has been executed, as the vehicle azimuth angle. As another embodiment, the acquisition processing unit 715 may acquire an average value of the vehicle azimuth angle corresponding to the travel path from the first position to the position after the predetermined distance has been traveled or the predetermined time has elapsed as the vehicle azimuth angle.

The registration processing unit 716 registers the first position at which the first predetermined motion of the work vehicle 10 (such as a lowering motion of the work machine 14) was executed as the first reference point (point A) in the same manner as in the “first route generation mode”. For example, as shown in FIG. 8A, in the registration processing unit 716, when the work machine 14 is lowered and a travel distance L0 of the work vehicle 10 from the position p1 (first position) of the work vehicle 10 at the time in which planting work became possible reaches the first predetermined distance, the registration processing unit 716 registers the position p1 as the first reference point (point A).

As another embodiment, when the work machine 14 is lowered and the first predetermined time has elapsed from the time in which planting work became possible, the registration processing unit 716 may register the position p1 as the first reference point (point A). Furthermore, when the work machine 14 is lowered and the travel distance L0 of the work vehicle 10 from the position p1 (first position) of the work vehicle 10 at the time in which planting work became possible reaches the first predetermined distance, and the work machine 14 is lowered and the first predetermined time has elapsed from the time in which planting work became possible, the registration processing unit 716 may register the position p1 as the first reference point (point A).

The generation processing unit 714 generates the target route R based on the first reference point (point A) registered by the registration processing unit 716, and the vehicle azimuth angle corresponding to the travel path acquired by the acquisition processing unit 715. More specifically, the setting processing unit 713 sets a straight line that passes through the first reference point (point A) corresponding to the position at which the predetermined motion of the work vehicle 10 is executed and extends in the direction of the vehicle azimuth angle of the travel path as the reference line L1. The generation processing unit 714 generates a travel route (target route R) including the reference line L1 and a plurality of straight lines that are parallel to the reference line L1.

In the second route generation mode that is referenced to the travel path, the operation control unit 71 may receive an operation that presses the point A registration button Ka from the operator and register the current position of the work vehicle 10 as the first reference point (point A), and generate the reference line L1 and the target route R based on the first reference point (point A) and the vehicle azimuth angle (average vehicle azimuth angle) of the travel path.

[Third Route Generation Mode]

When the operator selects "point A+set azimuth angle" (selection item K3) on the setting screen P1 (see FIG. 5A) and presses the confirmation button K0, the reception processing unit 712 receives the selection operation from the operator, and the setting processing unit 713 specifies the third route generation mode.

In the third route generation mode, the setting processing unit 713 sets the set azimuth angle, which is an angle relative to a reference azimuth (such as north). For example, the display processing unit 711 displays an input field into which an angle is input to a setting screen (not shown), and the reception processing unit 712 receives an angle input operation from the operator. The operator inputs the desired angle. Then, the setting processing unit 713 sets the angle that has been input by the operator as the set azimuth angle.

When the setting processing unit 713 sets the set azimuth angle, the display processing unit 711 causes the operation display unit 73 to display the work screen D1 (see FIG. 6A) on which a setting operation to set the reference line L1 is received from the operator. The operator moves the work vehicle 10 to a desired position in the field F and presses the point A registration button Ka. For example, the operator moves the work vehicle 10 to a work start position in the field F and presses the point A registration button Ka (see FIG. 6A). When the operator presses the point A registration button Ka, the setting processing unit 713 registers the current position of the work vehicle 10 as the reference point (point A). After point A is registered, the setting processing unit 713 sets a straight line that passes through point A and extends in a direction of the set azimuth angle as the reference line L1. The setting processing unit 713 may be capable of adjusting the azimuth of the reference line L1 that has been created. For example, the setting processing unit 713 causes the work screen D1 to display the reference line L1 that has been created, and sets (registers) the reference line L1 when the registration operation is received from the operator. On the other hand, when the setting processing unit 713 receives an operation from the operator to change the azimuth of the reference line L1 (for example, a touch operation on the screen), it adjusts the azimuth of the reference line L1 according to the operation. When the setting processing unit 713 receives an operation to register point A, it may display a selection screen that allows the reference line L1 to be registered or adjusted. The generation processing unit 714 generates a travel route (target route R) including the reference line L1 and a plurality of straight lines that are parallel to the reference line L1. The generation processing unit 714 registers the generated target route R in the storage unit 72 and causes the operation display unit 73 to display the generated target route R.

In this way, in the third route generation mode, the operation control unit 71 receives an input operation of an angle relative to a reference azimuth from the operator, and the target route R is generated based on the angle (set azimuth angle) input by the operator.

As described above, the operation control unit 71 generates the target route R in a route generation mode that is selected by the operator from among the plurality of route generation modes (the first route generation mode, the second route generation mode, and the third route generation mode).

After the target route R is generated, the operator instructs the work vehicle 10 to start traveling autonomously in the field F (travel start instruction). For example, when the work vehicle 10 satisfies an autonomous travel start condition and is in a state where it is capable of traveling autonomously, the operator can issue the travel start instruction. When the travel start instruction is acquired from the operator, the vehicle control device 11 executes autonomous travel processing according to the target route R corresponding to the route generation mode that has been set.

More specifically, in the vehicle control device 11, when the work vehicle 10 satisfies the autonomous travel start condition, the operator presses an autonomous travel button (not shown) on the operation display unit 73 and issues a travel start instruction. When the travel start instruction is received, the vehicle control device 11 starts automatic steering of the work vehicle 10 such that the work vehicle 10 travels along the target route R that has been generated in the route generation mode that has been set. In this way, the vehicle control device 11 causes the work vehicle 10 to travel autonomously along the straight routes by automatic steering.

When the work vehicle 10 starts traveling autonomously, the vehicle control device 11 causes the operation device 17 to display a work screen. For example, based on information (travel information and the like) acquired from the vehicle control device 11, the operation device 17 causes the work screen of the operation display unit 73 to display the location of the work vehicle 10, the straight routes, the worked area (work status), guidance information (operation guidance information), and the like.

The vehicle control device 11 ends the automatic steering at the end of the straight route. For example, when the work vehicle 10 is performing straight travel by automatic steering and approaches the end of the work route (straight route), the vehicle control device 11 notifies the operator of the guidance information K2 and ends the automatic steering in response to an operation from the operator. The position of the end of each work route may be a position that is a predetermined distance inside the end portion of the field F, a position that is specified in advance by the operator, a position that is aligned with a position in which the operator switched from autonomous travel to manual travel in the immediately preceding worked route (a position in which the work route intersects a line which passes through the position at which switching was performed to manual travel and is perpendicular to the worked route, or a position in which the work route intersects a line which passes through the position at which switching was performed to manual travel and is parallel to an edge of the field F), a position in which the work route intersects a line which passes through point B of the reference line L1 and is perpendicular to the reference line L1, and the like.

[Route Generation Processing]

An example of the route generation processing executed by the operation control unit 71 of the operation device 17 will be described below. The present invention may be viewed as an invention of a route generation method in which the operation device 17 executes part or all of the route generation processing, or as an invention of a route generation program that causes the operation device 17 to execute part or all of the route generation method. One or more processors may execute the route generation processing.

Figure 10:
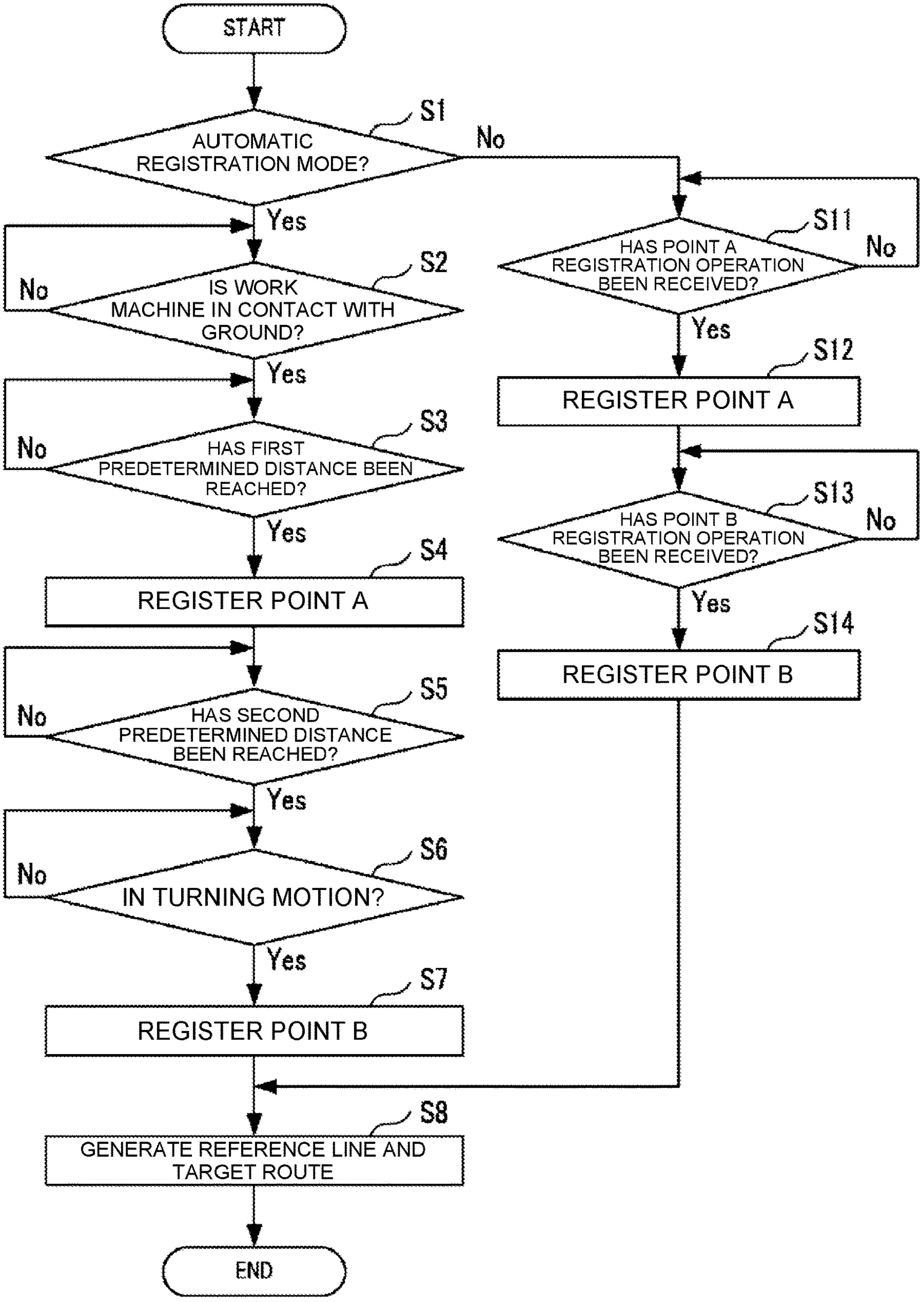
FIG. 10 is a flowchart illustrating an example of the procedure of route generation processing corresponding to a first route generation mode that is executed by an operation device according to an embodiment of the present invention.

FIG. 10 is a flowchart showing an example of the route generation processing corresponding to the first route generation mode ("point A+point B" mode).

In step S1, the operation control unit 71 determines whether or not a selection operation of the "automatic registration" mode of the "point A+point B" mode has been received from the operator. For example, on the setting screen P1 (see FIG. 5B), the operator selects "manual registration" (setting item K11) if it is desirable to generate the target route R by registering the first reference point (point A) and the second reference point (point B) by registration operations performed by themselves (manually), and selects "automatic registration" (setting item K12) if it is desirable generate the target route R by automatically registering the first reference point (point A) and the second reference point (point B) by a predetermined motion of the work vehicle 10. If the operation control unit 71 receives a selection operation of the "automatic registration" mode from the operator (S: Yes), it shifts the processing to step S2. On the other hand, if the operation control unit 71 receives a selection operation of the "manual registration" mode from the operator (S: No), it shifts the processing to step S11.

In step S2, the operation control unit 71 determines whether or not the work machine 14 is in contact with the ground surface. More specifically, when the operator moves the work vehicle 10 to the start position of the planting work in the field F and performs an operation that lowers the work machine 14 (first predetermined motion), the work machine 14 is lowered and the floats 36 make contact with the ground surface. Furthermore, when the work machine 14 is lowered, the operator starts the manual travel of the work vehicle 10 by operating the main speed change lever 13L or the like. When the operation control unit 71 acquires a detection signal indicating that the floats 36 have made contact with the ground surface from the work machine 14 or the float sensor (S2: Yes), it shifts the processing to step S3. The operation control unit 71 waits until it obtains a detection signal indicating that the floats 36 have made contact with the ground surface (S2: No). The motion of lowering the work machine 14 is an example of the predetermined motion of the present invention.

In step S3, the operation control unit 71 determines whether or not the work vehicle 10 has reached the first predetermined distance. More specifically, the operation control unit 71 determines whether or not the travel distance L0 (see FIG. 8A) of the work vehicle 10 from the position p1 (first position) at which the work vehicle 10 started to travel with the work machine 14 being lowered has reached the first predetermined distance. If the operation control unit 71 determines that the work vehicle 10 has reached the first predetermined distance (S3: Yes), it shifts the processing to step S4. The operation control unit 71 waits until the work vehicle 10 reaches the first predetermined distance (S3: No), and the work vehicle 10 continues manual travel by the operator.

In step S4, the operation control unit 71 registers the position p1 (first position) as the first reference point (point A) (see FIG. 8A). That is, the operation control unit 71 registers the position p1 at which the first predetermined motion was performed as the first reference point (point A) at the time the work vehicle 10 has traveled the first predetermined distance. As another embodiment, the operation control unit 71 may register the position p1 at which the first predetermined motion was performed as the first reference point (point A) at the time the first predetermined time has elapsed since the work vehicle 10 started to travel from the position p1.

In step S5, the operation control unit 71 determines whether or not the work vehicle 10 has reached the second predetermined distance. More specifically, the operation control unit 71 determines whether or not the travel distance L0 (see FIG. 8B) of the work vehicle 10 from the position p1 (first position) at which the work vehicle 10 started to travel with the work machine 14 being lowered has reached the second predetermined distance (note: second predetermined distance >first predetermined distance). If the operation control unit 71 determines that the work vehicle 10 has reached the second predetermined distance (S5: Yes), it shifts the processing to step S6. The operation control unit 71 waits until the work vehicle 10 reaches the second predetermined distance (S5: No), and the work vehicle 10 continues manual travel by the operator.

In step S6, the operation control unit 71 determines whether or not the work vehicle 10 has performed a turning motion. More specifically, the operator causes the work vehicle 10 to travel from the first position p1 in the field F and performs a turning operation at an end portion of the field F. When the operation control unit 71 acquires from the travel device 13 a detection signal indicating that the steering angle of the steering wheel 137 of the work vehicle 10 is greater than or equal to a predetermined angle, it determines that the work vehicle 10 has performed a turning motion (S6: Yes), and shifts the processing to step S7. The processing waits until the work vehicle 10 performs a turning motion (S6: No). The turning motion is an example of the predetermined motion of the present invention.

In step S7, the operation control unit 71 registers the position p2 (second position) as the second reference point (point B) (see FIG. 8A). For example, the operation control unit 71 registers the position p2 of the work vehicle 10 at the time the steering angle of the steering wheel 137 becomes greater than or equal to the predetermined angle as the second reference point (point B). That is, the operation control unit 71 registers the position p2 at which the second predetermined motion was performed as the second reference point (point B) at the time the work vehicle 10 has traveled the second predetermined distance. As another embodiment, the operation control unit 71 may register the position p2 at which the second predetermined motion was performed as the second reference point (point B) at the time the second predetermined time has elapsed since the work vehicle 10 started to travel from the position p1.

In step S8, the operation control unit 71 generates the reference line L1 that passes through the first reference point (point A) and the second reference point (point B), and also generates the target route R that includes a plurality of straight lines parallel to the reference line L1 (see FIG. 7B).

In step S1, when a selection operation of the "manual registration" mode (see FIG. 5B) is received from the operator, in step S11 (S1: No), the operation control unit 71 determines whether or not an operation that registers the first reference point (point A) has been received from the operator. For example, the operator moves the work vehicle 10 to a desired position in the field F and presses the point A registration button Ka (see FIG. 6A). When the operator presses the point A registration button Ka, the operation control unit 71 receives an operation that registers the first reference point (point A) (S11: Yes), and shifts the processing to step S12. The operation control unit 71 waits until an operation that registers the first reference point (point A) is received (S11: No).

In step S12, the operation control unit 71 registers the position p1 (first position) as the first reference point (point A) (see FIG. 8A).

In step S13, the operation control unit 71 determines whether or not an operation that registers the second reference point (point B) has been received from the operator. For example, the operator drives the work vehicle 10 straight in a direction that is parallel to a work direction (for example, a planting direction) in which travel and work is to be performed by the work vehicle 10 (see FIG. 7A). The operator presses a point B registration button Kb (see FIG. 6B) at a desired position (for example, an outer peripheral end portion of the field F). When the operator presses the point B registration button Kb, the operation control unit 71 receives an operation that registers the second reference point (point B) (S13: Yes), and shifts the processing to step S14. The operation control unit 71 waits until it receives an operation that registers the second reference point (point B) (S13: No).

In step S14, the operation control unit 71 registers the position p2 (second position) as the second reference point (point B) (see FIG. 7A). After step S14, the operation control unit 71 shifts the processing to step S8. In step S8, the operation control unit 71 generates the reference line L1 that passes through the first reference point (point A) and the second reference point (point B), and also generates the target route R that includes a plurality of straight lines parallel to the reference line L1 (see FIG. 7B).

In this way, the operation control unit 71 executes the route generation processing corresponding to the first route generation mode ("point A+point B" mode).

Figure 11:
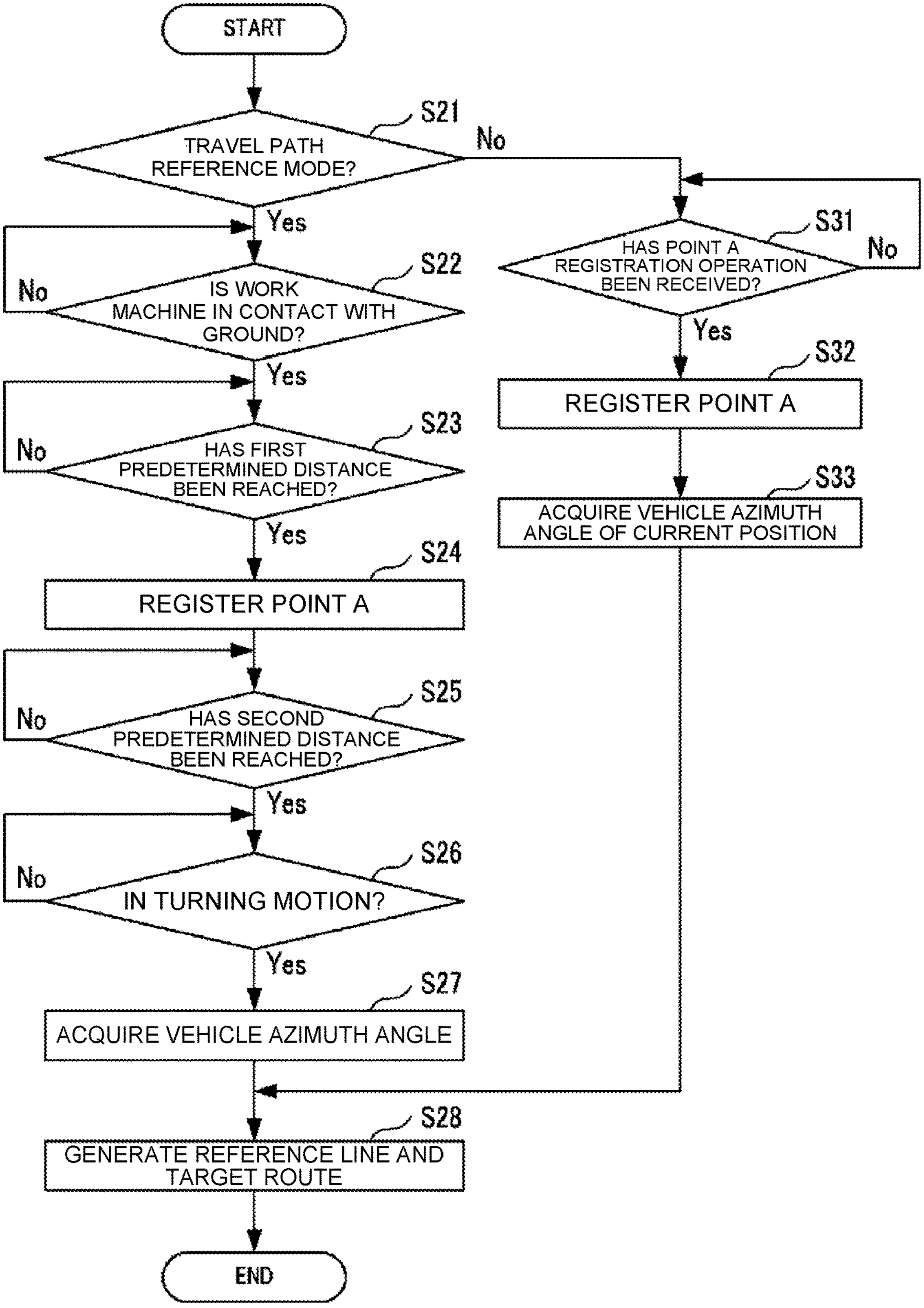
FIG. 11 is a flowchart illustrating an example of the procedure of route generation processing corresponding to a first route generation mode that is executed by an operation device according to an embodiment of the present invention.

FIG. 11 is a flowchart showing an example of the route generation processing corresponding to the second route generation mode ("point A+vehicle azimuth angle" mode).

In step S21, the operation control unit 71 determines whether or not a selection operation of the "referenced to travel path" mode of the "point A+vehicle azimuth angle" mode has been received from the operator. For example, on the setting screen P3 (see FIG. 9B), the operator selects "referenced to point A" (setting item K31) when generation of the target route R based on the vehicle azimuth angle of the work vehicle 10 at the first reference point (point A) is desired, and selects "referenced to travel path" (setting item K32) when generation of the target route R based on the vehicle azimuth angle corresponding to the travel path of the work vehicle 10 from the first reference point (point A) is desired. If the operation control unit 71 receives a selection operation of the "referenced to travel path" mode from the operator (S21: Yes), it shifts the processing to step S22. On the other hand, if the operation control unit 71 receives a selection operation of the "referenced to point A" mode from the operator (S21: No), it shifts the processing to step S31.

In step S22, the operation control unit 71 determines whether or not the work machine 14 is in contact with the ground surface. More specifically, when the operator moves the work vehicle 10 to the start position of the planting work in the field F and performs an operation that lowers the work machine 14 (first predetermined motion), the work machine 14 is lowered and the floats 36 make contact with the ground surface. Furthermore, when the work machine 14 is lowered, the operator causes the work vehicle 10 to manually travel by operating the main speed change lever 13L or the like. When the operation control unit 71 acquires a detection signal indicating that the floats 36 have made contact with the ground surface from the work machine 14 or the float sensor (S22: Yes), it shifts the processing to step S23. The operation control unit 71 waits until it obtains a detection signal indicating that the floats 36 have made contact with the ground surface (S22: No).

In step S23, the operation control unit 71 determines whether or not the work vehicle 10 has reached the first predetermined distance. More specifically, the operation control unit 71 determines whether or not the travel distance L0 (see FIG. 8A) of the work vehicle 10 from the position p1 (first position) at which the work vehicle 10 started to travel with the work machine 14 being lowered has reached the first predetermined distance. If the operation control unit 71 determines that the work vehicle 10 has reached the first predetermined distance (S23: Yes), it shifts the processing to step S24. The operation control unit 71 waits until the work vehicle 10 reaches the first predetermined distance (S23: No), and the work vehicle 10 continues manual travel by the operator.

In step S24, the operation control unit 71 registers the position p1 (first position) as the first reference point (point A) (see FIG. 8A). That is, the operation control unit 71 registers the position p1 at which the first predetermined motion was performed as the first reference point (point A) at the time the work vehicle 10 has traveled the first predetermined distance. As another embodiment, the operation control unit 71 may register the position p1 at which the first predetermined motion was performed as the first reference point (point A) at the time the first predetermined time has elapsed since the work vehicle 10 started to travel from the position p1.

In step S25, the operation control unit 71 determines whether or not the work vehicle 10 has reached the second predetermined distance. More specifically, the operation control unit 71 determines whether or not the travel distance L0 (see FIG. 8B) of the work vehicle 10 from the position p1 (first position) at which the work vehicle 10 started to travel with the work machine 14 being lowered has reached the second predetermined distance (note: second predetermined distance >first predetermined distance). If the operation control unit 71 determines that the work vehicle 10 has reached the second predetermined distance (S25: Yes), it shifts the processing to step S26. The operation control unit 71 waits until the work vehicle 10 reaches the second predetermined distance (S25: No), and the work vehicle 10 continues manual travel by the operator.

In step S26, the operation control unit 71 determines whether or not the work vehicle 10 has performed a turning motion. More specifically, the operator causes the work vehicle 10 to travel from the first position p1 in the field F and performs a turning operation at an end portion of the field F. When the operation control unit 71 acquires from the travel device 13 a detection signal indicating that the steering angle of the steering wheel 137 of the work vehicle 10 is greater than or equal to a predetermined angle, it determines that the work vehicle 10 has performed a turning motion (S26: Yes), and shifts the processing to step S27. The processing waits until the work vehicle 10 performs a turning motion (S26: No).

In step S27, the operation control unit 71 acquires the vehicle azimuth angle. More specifically, the operation control unit 71 acquires, referenced to the position p1 (first position), an average value of the vehicle azimuth angle (average vehicle azimuth angle) corresponding to the travel path (travel path of the travel distance L0 in FIG. 8B) traveled after the first predetermined motion was executed (from the first position p1) until the work vehicle 10 traveled the second predetermined distance or the second predetermined time elapsed, as the vehicle azimuth angle.

In step S28, the operation control unit 71 generates the reference line L1 based on the first reference point (point A) and the vehicle azimuth angle, and also generates the target route R that includes a plurality of straight lines parallel to the reference line L1. For example, the operation control unit 71 sets a straight line that passes through the first reference point (point A) that extends in the direction of the vehicle azimuth angle as the reference line L1, and generates the target route R from the reference line L1.

In step S21, when a selection operation of the "referenced to point A" mode is received from the operator, in step S31 (S21: No), the operation control unit 71 determines whether or not an operation that registers the first reference point (point A) has been received from the operator. For example, the operator moves the work vehicle 10 to a desired position in the field F and presses the point A registration button Ka (see FIG. 6A). When the operator presses the point A registration button Ka, the operation control unit 71 receives an operation that registers the first reference point (point A) (S31: Yes), and shifts the processing to step S32. The operation control unit 71 waits until an operation that registers the first reference point (point A) is received (S31: No).

In step S32, the operation control unit 71 registers the position p1 (first position) as the first reference point (point A) (see FIG. 8A).

In step S33, the operation control unit 71 acquires the current azimuth (vehicle azimuth angle) of the work vehicle 10 at the position p1. After step S33, the operation control unit 71 shifts the processing to step S28. In step S28, the operation control unit 71 sets a straight line that passes through the first reference point (point A) that extends in the direction of the vehicle azimuth angle of the work vehicle 10 at the position p1 as the reference line L1, and generates the target route R from the reference line L1.

In this way, the operation control unit 71 executes the route generation processing corresponding to the second route generation mode ("point A+vehicle azimuth angle" mode).

As described above, the operation device 17 according to the present embodiment generates the target route R that causes the work vehicle 10 travels autonomously in the field F. More specifically, the operation device 17 acquires the position information of a predetermined position of the work vehicle 10 in the field F, registers the predetermined position as a reference point when the work vehicle 10 has traveled a predetermined distance from the predetermined position, or when a predetermined time has elapsed since the work vehicle 10 started to travel from the predetermined position, and generates the target route R based on the reference point.

For example, the operation device 17 registers the first position p1 (see FIG. 8A) at which the first predetermined motion of the work vehicle 10 (such as a lowering motion of the work machine 14) is executed as the first reference point (point A), registers the second position p2 (see FIG. 8B) at which the second predetermined motion of the work vehicle 10 (such as a turning motion of the work vehicle 10) is executed as the second reference point (point B), and generates the target route R based on the reference line L1 that passes through point A and point B (see FIGS. 7A and 7B).

Furthermore, for example, the operation device 17 registers the first position p1 (see FIG. 8A) at which the first predetermined motion of the work vehicle 10 (such as a lowering motion of the work machine 14) is executed as the first reference point (point A), acquires the vehicle azimuth angle (such as an average value of the vehicle azimuth angle) based on the travel path that has been traveled by the work vehicle 10 from the first position p1, and generates the target route R based on point A and the vehicle azimuth angle.

According to the configuration above, for example, it is not necessary for the operator to perform operations that register point A and point B, or to perform an operation that inputs the vehicle azimuth angle. Furthermore, because a configuration is provided in which the predetermined position is registered as the reference point when the work vehicle 10 has traveled the predetermined distance from the predetermined position, or the predetermined time has elapsed since the work vehicle 10 started to travel from the predetermined position, it is possible to prevent a position corresponding to a behavior of the work vehicle 10 not intended by the operator from being registered as the reference point. Therefore, it is possible to improve the workability of the generation work of the target route R.

Other Embodiments

The present invention is not limited to the embodiment described above. Other embodiments of the present invention are described below.

Figure 5B:
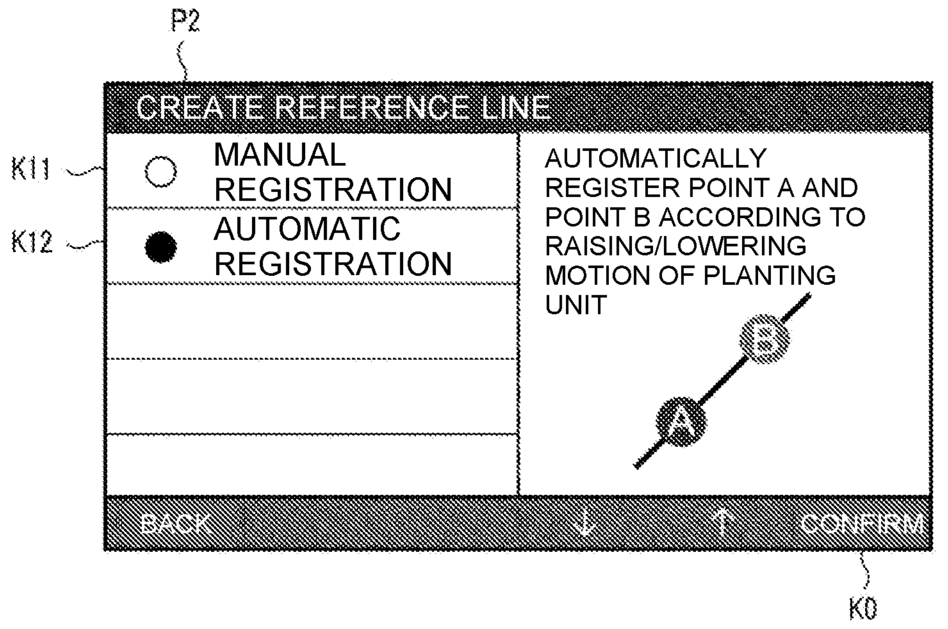
FIG. 5B is a diagram illustrating an example of a setting screen that is displayed on an operation device according to an embodiment of the present invention.

As mentioned above, the operation device 17 has a function that registers a first reference point (point A) and a second reference point (point B) due to a registration operation from the operator ("manual registration" mode in FIG. 5B). As another embodiment of the present invention, the operation control unit 71 may prompt the operator to perform a registration operation when it is determined in the manual registration mode that the operator has forgotten to perform the registration operation. For example, when the operator causes the work vehicle 10 to manually travel (perform straight travel) after registering point A (see FIG. 6A) and forgets to perform an operation that registers point B (see FIG. 6B) at the end portion of the field F and turns the work vehicle 10, the operation control unit 71 determines that the operator has forgotten to perform the registration operation of point B, and displays a message on the work screen D1 (see FIG. 12) prompting the registration operation of point B.

Figure 12:
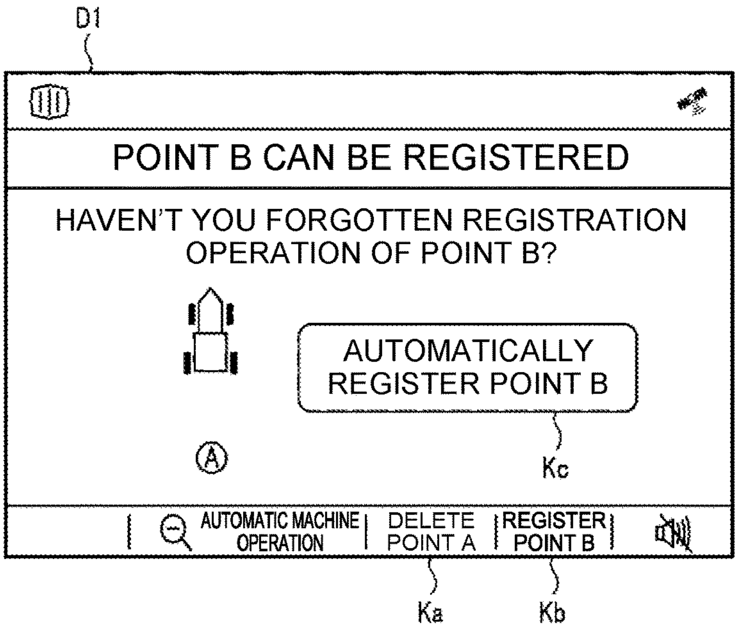
FIG. 12 is a diagram illustrating an example of a work screen that is displayed on an operation device according to another embodiment of the present invention.

After confirming the message, for example, the operator moves the work vehicle 10 to the position to be registered as point B, and presses the point B registration button Kb (see FIG. 12).

Furthermore, as shown in FIG. 12, the operation control unit 71 may display an automatic registration button Kc that receives an automatic registration of point B. When the operator presses the automatic registration button Kc, the operation control unit 71 registers the position at which the turning motion of the work vehicle 10 was started, or the position at which a raising motion of the work machine 14 was started as point B.

If the operation control unit 71 determines that the operator has forgotten to perform the registration operation of point A, it may similarly display a message that prompts the registration operation of point A and the automatic registration button Kc on the work screen D1. For example, the operation control unit 71 displays the message and the automatic registration button Kc when manual travel of the work vehicle 10 is started in a state where the registration operation of point A has not been received, and the predetermined distance has been traveled or the predetermined time has elapsed.

Figure 13:
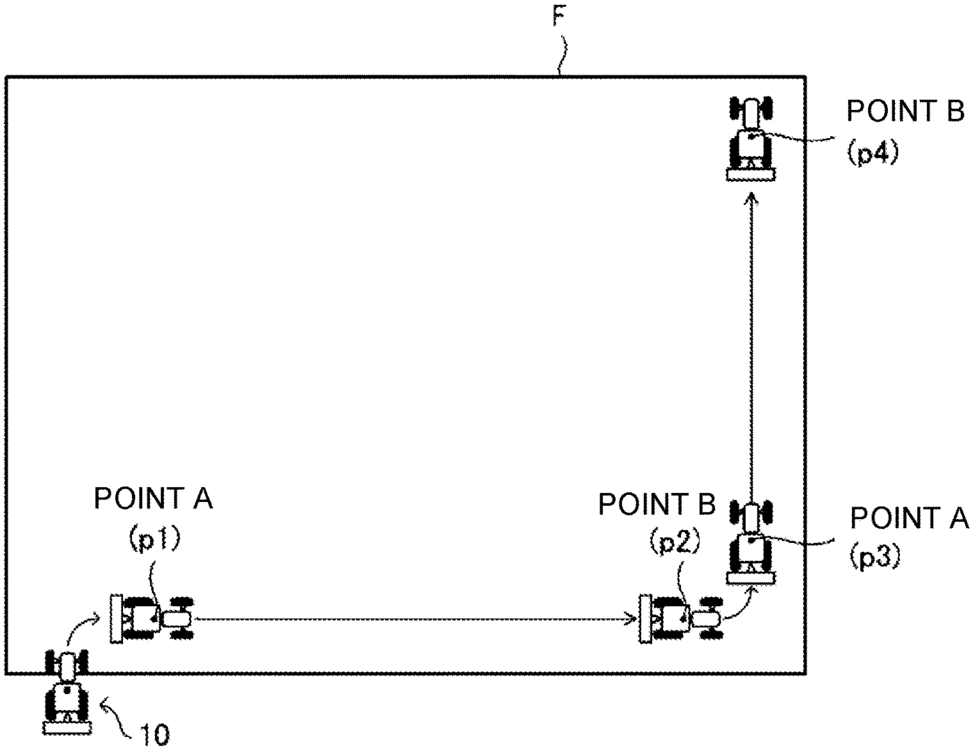
FIG. 13 is a diagram illustrating an example of a travel route of a work vehicle according to another embodiment of the present invention.

Further, in the "automatic registration" mode, in which the first reference point (point A) and the second reference point (point B) are automatically registered, it is possible that positions that are not intended by the operator may be registered as point A and point B. For example, as shown in FIG. 13, when the operator causes the work vehicle 10 to enter the field F from the entrance of the field F and manually travel to a position p3 at which work is to be started, it is possible that the position p1 may be registered as point A in response to motions such as turning of the work vehicle 10 that has entered the field F or lowering of the work machine 14, and the position p2 may be registered as point B according to motions such as the work vehicle 10 being turned after performing straight travel or the work machine 14 being raised. When the positions p1 and p2 are registered as point A and point B, a problem occurs in which a target route R that is not intended by the operator is also generated.

Therefore, as another embodiment of the present invention, the operation control unit 71 may be provided with a configuration in which the operator is asked whether or not the predetermined position corresponding to the predetermined motion is to be registered as the reference point of the reference line L1, and the predetermined position is registered as the reference point when a registration instruction is acquired from the operator.

Figure 14:
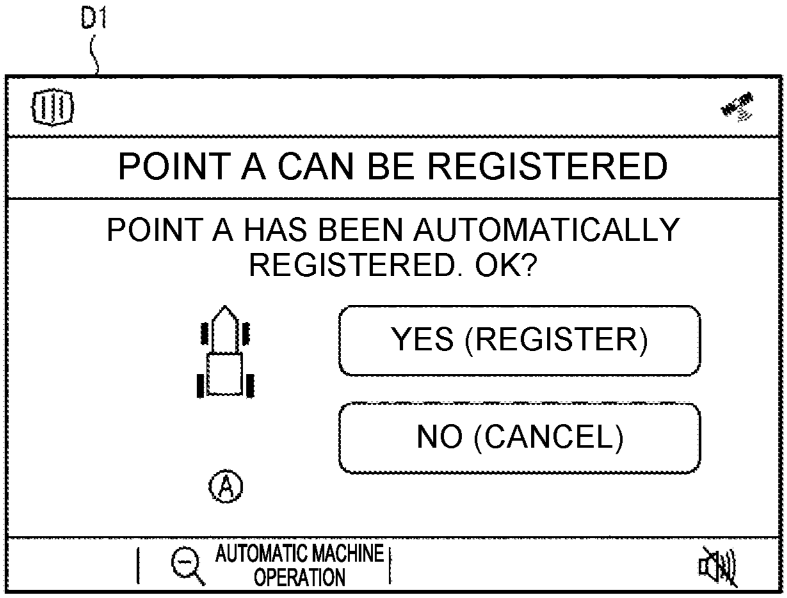
FIG. 14 is a diagram illustrating an example of a work screen that is displayed on an operation device according to another embodiment of the present invention.

For example, as shown in FIG. 14, the operation control unit 71 displays a message on the work screen D1 asking whether or not to register the position p1 as point A when the predetermined motion is performed at the position p1. The operation control unit 71 registers the position p1 as point A when the operator selects "yes (register)", and does not register the position p1 as point A and deletes the information of the position p1 when the operator selects "no (cancel)". In the example shown in FIG. 14, the operator does not register the positions p1 and p2 as the reference points on the work screen D1, and issues an instruction that registers the positions p3 and p4 as the reference points (point A and point B). As a result, it is possible to prevent the target route R from being generated as a result of a position that is not intended by the operator being registered as the reference point.

In a similar manner, in the second route generation mode ("point A+vehicle azimuth angle" mode), the operation control unit 71 may ask the operator whether or not a vehicle azimuth angle calculated based on the travel path is to be registered.

The work vehicle 10 of the present invention may be capable of traveling autonomously even when turning. In this case, the target route R includes straight routes and turning routes. Furthermore, in the work vehicle 10, the operator may be able to switch between whether autonomous travel or manual travel is performed during turning. Moreover, the work vehicle 10 may also be capable of traveling autonomously on the target route R while unmanned. In this case, the operator may remotely control the operation terminal to issue a travel start instruction and the like. In addition, the operation terminal that is used for remote control may be the operation device 17 according to the present embodiment, or may include each of the processing units of the operation device 17.

The route generation system of the present invention may be configured by the operation device 17 alone, or may be configured by a server provided with each of the processing units included in the operation device 17. Also, the route generation system may be configured by the work vehicle 10 provided with the operation device 17.

[Supplementary Notes of the Invention]

A summary of the invention extracted from the embodiment is described as the following supplementary notes. Note that the configurations and processing functions described in the supplementary notes below may be selected, omitted, and combined as appropriate.

<Supplementary Note 1>

A route generation method that generates a target route for causing a work vehicle to travel autonomously in a field, and executes the steps of:

acquiring position information of a predetermined position of the work vehicle in the field;

registering the predetermined position as a reference point when the work vehicle has traveled a predetermined distance from the predetermined position, or when a predetermined time has elapsed since the work vehicle started to travel from the predetermined position; and generating the target route based on the reference point.

<Supplementary Note 2>

The route generation method according to supplementary note 1, wherein the predetermined position is a position in which a predetermined motion of the work vehicle is executed.

<Supplementary Note 3>

The route generation method according to supplementary note 2, wherein a first position at which a first predetermined motion of the work vehicle is executed is registered as a first reference point, a second position at which a second predetermined motion of the work vehicle is executed is registered as a second reference point, and the target route is generated based on a reference line that passes through the first reference point and the second reference point.

<Supplementary Note 4>

The route generation method according to supplementary note 3, wherein the first position is registered as the first reference point when the work vehicle has traveled a first predetermined distance from the first position, or when a first predetermined time has elapsed since the work vehicle started to travel from the first position, and the second position is registered as the second reference point when the work vehicle has traveled a second predetermined distance from the first position, or when a second predetermined time has elapsed since the work vehicle started to travel from the first position.

<Supplementary Note 5>

The route generation method according to supplementary note 2, wherein a first position at which a first predetermined motion of the work vehicle is executed is registered as a first reference point, a vehicle azimuth angle is acquired based on a travel path that has been traveled by the work vehicle from the first position, and the target route is generated based on the first reference point and the vehicle azimuth angle.

<Supplementary Note 6>

The route generation method according to supplementary note 5, wherein the first position is registered as the first reference point when the work vehicle has traveled a first predetermined distance from the first position, or when a first predetermined time has elapsed since the work vehicle started to travel from the first position, and the vehicle azimuth angle is acquired when the work vehicle has traveled a second predetermined distance from the first position, or when a second predetermined time has elapsed since the work vehicle started to travel from the first position.

<Supplementary Note 7>

The route generation method according to supplementary note 6, wherein an average value of a vehicle azimuth angle corresponding to a travel path that has been traveled by the work vehicle from the first position when the second predetermined distance has been traveled, or a travel path that has been traveled by the work vehicle when the second predetermined time elapses after starting to travel from the first position, is acquired as the vehicle azimuth angle.

<Supplementary Note 8>

The route generation method according to any one of supplementary notes 5 to 7, wherein when the work vehicle has traveled a first predetermined distance from the first position, or when a first predetermined time has elapsed since the work vehicle started to travel from the first position, and then a second predetermined motion of the work vehicle is executed, an average value of a vehicle azimuth angle corresponding to a travel path from the first position to a second position at which the second predetermined motion has been executed is acquired as the vehicle azimuth angle.

<Supplementary Note 9>

The route generation method according to any one of supplementary notes 2 to 8, wherein the predetermined motion includes at least one of a raising/lowering motion of a work machine provided in the work vehicle, a motion that switches a forward direction of the work vehicle, a motion that changes a vehicle speed of the work vehicle, and a motion that switches a working clutch.

<Supplementary Note 10>

The route generation method according to any one of supplementary notes 1 to 9, wherein a user is asked whether or not the predetermined position is to be registered as the reference point, and the predetermined position is registered as the reference point when a registration instruction is acquired from the user.

REFERENCE SIGNS LIST

10 Work vehicle
11 Vehicle control device
12 Storage unit
13 Travel device
14 Work machine
15 Communication unit
16 Positioning device
17 Operation device
71 Operation control unit
72 Storage unit
73 Operation display unit
711 Display processing unit
712 Reception processing unit
713 Setting processing unit
714 Generation processing unit
715 Acquisition processing unit
716 Registration processing unit
F Field
L0 Travel distance
L1 Reference line
R Target route
p1 First position
p2 Second position

What is claimed is:

1. A processor-implemented route generation method that generates a target route for causing a work vehicle to travel autonomously in a field, and executes the steps of:

acquiring, based on received Global Navigation Satellite System (GNSS) signals, at least one geographical position information of the work vehicle corresponding to at least one location of the work vehicle in the field, the at least one location of the work vehicle comprising a predetermined location of the work vehicle;

automatically registering, based on the corresponding at least one geographical position information, the predetermined location as a first reference point when the work vehicle has either traveled a first predetermined distance from the predetermined location, or when a first predetermined time has elapsed since the work vehicle started to travel from the predetermined location;

generating the target route based on the first reference point; and initiating a display of the generated target route.

2. The route generation method according to claim 1, wherein acquiring the at least one geographical position information is performed when one or more predetermined motions of the work vehicle are executed.

3. The route generation method according to claim 2, wherein registering the first reference point occurs when a first predetermined motion of the work vehicle is executed, and the method further comprises:

automatically registering, as a second reference point, based on the corresponding at least one geographical position information, a second location of the work vehicle at which a second predetermined motion of the work vehicle is executed, and generating the target route is based on a reference line that passes through the first reference point and the second reference point.

4. The route generation method according to claim 3, wherein the second location is registered as the second reference point when the work vehicle has traveled a second predetermined distance from the first reference point, or when a second predetermined time has elapsed since the work vehicle started to travel from the first reference point.

5. The route generation method according to claim 2, wherein registering the first reference point occurs when a first predetermined motion of the work vehicle is executed and the method further comprises:

acquiring a vehicle azimuth angle based on a travel path that has been traveled by the work vehicle from the first reference point, and generating the target route is based on the first reference point and the vehicle azimuth angle.

6. The route generation method according to claim 5, wherein the vehicle azimuth angle is acquired when the work vehicle has traveled a second predetermined distance from the first reference point, or when a second predetermined time has elapsed since the work vehicle started to travel from the first reference point.

7. The route generation method according to claim 6, wherein the vehicle azimuth angle is determined as an average vehicle azimuth angle over the travel path.

8. The route generation method according to claim 5, wherein the vehicle azimuth angle is determined as an average vehicle azimuth angle over the travel path from the first reference point to a second location at which in response to a registration instruction from the user.

9. The route generation method according to claim 2, wherein the one or more predetermined motions include at least one of:

a raising motion or a lowering motion of a work machine provided in the work vehicle, a motion that switches a forward direction of the work vehicle, a motion that changes a vehicle speed of the work vehicle, a motion that switches a working clutch, and work by a marker that generates a reference line of the target route of a subsequent journey or an operation that stores the marker in a storage position.

10. The route generation method according to claim 1, wherein registering the at least one predetermined location comprises:

querying a user about registration of the predetermined position as the first reference point, and registering the predetermined position as the first reference point in response to a registration instruction from the user.

11. A route generation system comprising a processor operationally coupled to a work vehicle that generates a target route for causing the work vehicle to travel autonomously in a field, the processor comprising:

an acquisition processing unit that acquires at least one geographical position information of the work vehicle corresponding to at least one location of the work vehicle in the field, the at least one location of the work vehicle comprising a predetermined location of the work vehicle;

a registration processing unit that automatically registers, based on the corresponding acquired at least one geographical position information, the predetermined location as a first reference point when the work vehicle has either traveled a predetermined distance from the predetermined location, or when a predetermined time has elapsed since the work vehicle started to travel from the predetermined location;

a generation processing unit that generates the target route based on the first reference point; and a display unit that displays the generated target route.

12. A non-transitory computer-readable medium comprising instructions to configure a processor operationally coupled to a work vehicle to perform a target route generation method for the work vehicle to travel autonomously in a field, the method comprising:

acquiring, based on received Global Navigation Satellite System (GNSS) signals, at least one geographical position information of the work vehicle corresponding to at least one location of the work vehicle in the field, the at least one location of the work vehicle comprising a predetermined location of the work vehicle;

automatically registering, based on the corresponding acquired at least one geographical position information, the predetermined location as a first reference point when the work vehicle has either traveled a predetermined distance from the predetermined location, or when a predetermined time has elapsed since the work vehicle started to travel from the predetermined location;

generating the target route based on the first reference point; and initiating a display of the generated target route.

* * * * *